(12) United States Patent
Ketharaju et al.

(10) Patent No.: US 12,470,587 B2
(45) Date of Patent: Nov. 11, 2025

(54) SYSTEMS AND METHODS FOR REGULATING DATA COMMUNICATION

(71) Applicant: Wells Fargo Bank, N.A., San Francisco, CA (US)

(72) Inventors: Rameshchandra Bhaskar Ketharaju, Hyderabad (IN); Ashutosh Verma, Bangalore (IN); Debashis Ghosh, Charlotte, NC (US); Shuvam Sengupta, Kolkata (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 306 days.

(21) Appl. No.: 18/352,848

(22) Filed: Jul. 14, 2023

(65) Prior Publication Data

US 2025/0023901 A1     Jan. 16, 2025

(51) Int. Cl.
*H04L 9/40* (2022.01)
(52) U.S. Cl.
CPC .............................. *H04L 63/1433* (2013.01)
(58) Field of Classification Search
CPC ................................................ H04L 63/1433
See application file for complete search history.

(56) References Cited

U.S. PATENT DOCUMENTS

| | | | |
|---|---|---|---|
| 8,327,128 B1 * | 12/2012 | Prince | H04L 63/0884 713/153 |
| 10,009,378 B2 | 6/2018 | Chiviendacz et al. | |
| 10,397,070 B2 | 8/2019 | Allen et al. | |
| 10,432,652 B1 * | 10/2019 | Yona | H04L 63/1416 |
| 10,516,694 B1 * | 12/2019 | Gupta | H04L 63/1416 |
| 11,257,074 B2 | 2/2022 | Prakash et al. | |
| 11,997,125 B2 * | 5/2024 | Gurtu | H04L 63/1433 |
| 12,244,636 B1 * | 3/2025 | Anand | H04L 63/1433 |
| 2006/0041936 A1 * | 2/2006 | Anderson | H04L 63/1433 726/11 |
| 2017/0148021 A1 | 5/2017 | Goldstein et al. | |

(Continued)

FOREIGN PATENT DOCUMENTS

| | | | | |
|---|---|---|---|---|
| CN | 110149321 A | * | 8/2019 | ......... H04L 63/1425 |
| CN | 114844708 A | * | 8/2022 | ......... H04L 63/1466 |

(Continued)

*Primary Examiner* — Sarah Su
(74) *Attorney, Agent, or Firm* — K&L Gates LLP

(57) ABSTRACT

Systems, apparatuses, methods, and computer program products are disclosed for regulating data communication. An example method includes receiving, by transaction circuitry, a communication request and identifying, by data collection engine and based on the communication request, a set of security parameters. The example method further includes determining, by security analysis engine and based on the set of security parameters, a security score associated with the communication request and in an instance in which the security sore fails to satisfy a security requirement, determining, by the security analysis engine, one or more security actions based on the security score and performing, by the transaction circuitry, the one or more security actions. The example method further includes routing, by data regulation engine and based on a configuration table, a transaction associated with the communication request to a compliant communication channel.

20 Claims, 10 Drawing Sheets

(56) References Cited

U.S. PATENT DOCUMENTS

| | | | | |
|---|---|---|---|---|
| 2017/0237774 A1* | 8/2017 | Huque | ............... | H04W 12/06 |
| | | | | 726/4 |
| 2024/0073234 A1* | 2/2024 | Hulick, Jr. | ............ | G06F 21/552 |
| 2024/0098111 A1* | 3/2024 | Doron | ................ | H04L 63/1458 |

FOREIGN PATENT DOCUMENTS

| | | | | |
|---|---|---|---|---|
| CN | 118827199 A | * | 10/2024 | ............. H04L 67/10 |
| EP | 3422648 A2 | * | 1/2019 | ........... G06F 21/554 |
| KR | 102517982 B1 | * | 4/2023 | ............. H04L 63/10 |
| WO | WO-2014128284 A1 | * | 8/2014 | ............. H04L 63/20 |
| WO | WO-2019159907 A1 | * | 8/2019 | ........ H04L 63/1458 |
| WO | WO-2025029736 A1 | * | 2/2025 | .......... H04W 12/088 |

* cited by examiner

SYSTEMS AND METHODS FOR REGULATING DATA COMMUNICATION

BACKGROUND

Cellular networks are used for the transfer of information (e.g., data). Since emerging in the 1980s and through continuous growth in capability and sophistication in the ensuing decades, cellular networks have increasingly enabled innovation and advancement in many areas of society. However, even modern cellular networks exhibit various issues and shortcomings.

BRIEF SUMMARY

Embodiments disclosed herein provide a method to more robustly regulate the data communicated via cellular networks. Information transferred via cellular network may require different levels of security based on its sensitivity (e.g., highly sensitive information may require tighter security and privacy protections than less sensitive information). Despite this variance in sensitivity, currently the transfer of such information is performed according to a single set of protocols that does not differentiate the handling of information based on its sensitivity. As such, current cellular networks lack the flexibility needed for an increasingly interconnected and online society.

Traditionally, a central server may be tasked with receiving data provided from a computing device and then determining the level of security with which it will be transmitted. This may require additional communications between the computing device and the central server to designate this security protocol and authenticate the target information, which is computationally inefficient. Once authenticated, the central server may then be configured to route particular information using a particular communication channel. Furthermore, the central server then simply routes this information according to a set of static rules. However, if a communication channel and/or receiving entity is compromised, the central server may be blind to this security vulnerability and still send sensitive information.

To protect sensitive and/or high-security data from bad actors throughout the data communication process, many entities (e.g., businesses, or the like) may utilize enhanced authentication procedures, such as multifactor authentication, to ensure that only approved actors are involved in a prospective transmission of the data. Although multifactor authentication and other heightened authentication procedures can enhance the security of a transaction request, current implementations of multifactor authentication sequentially verify the different authentication factors, which leads to prolonged authentication times and delay. In addition, the need to transmit multiple factors of authentication may only be known after an initial transaction request, and may cause the parties to incur an extra roundtrip exchange of authentication information, further delaying the data transmission process. The need for a series of sequenced communications is computationally inefficient and leads to a reduction in available network bandwidth.

Example embodiments described herein mitigate the concerns posed by transferring data of various security via a compliant communication channel of a cellular network (e.g., a 5G cellular network or a 6G cellular network). To do so, some example embodiments may leverage capabilities of advanced cellular networks (e.g., sixth generation (6G) cellular networks), as further discussed herein. For instance, example embodiments may receive a communication request and identify a set of security parameters associated with the received communication request. In some embodiments, the set of security parameters may be data included in the communication request that describes the level of security associated with the communication request. For example, some security parameters included in the set of security parameters may be the transaction amount, the counterparty, the time of day the communication request was initiated, the geographic location of the computing device that received the communication request, trace signals from devices in proximity to the computing device that received the communication request, or the like.

Example embodiments may also determine a security score associated with the communication request based on the identified set of security parameters. In some embodiments, the security score may be a computed score describing the level of security associated with a transaction. In some embodiments, the security score may be a numerical score, while in other embodiments the security score may be converted into a categorical result (e.g., a low security category, medium security category, high security category, a numbered classification such as tier 1, tier 2, or tier 3, a color-coded classification such as green, yellow, or red, and/or the like).

If the security score fails to satisfy a security requirement associated with the set of security parameters included in the communication request, example embodiments may also initiate one or more security actions. In some embodiments, the one or more security actions may be authentication methods (e.g., single factor authentication, multifactor authentication, or the like). Example embodiments may also perform the one or more determined security actions on a computing device prior to transmitting the transaction. Although potentially leveraging multifactor authentication and/or other enhanced authentication protocols, example embodiments described herein may do so while eliminating the need for multiple roundtrip communications between a central server (or other device) and the computing device, thus resulting in an overall reduction in network bandwidth usage and a more computationally efficient system for facilitating communications.

Example embodiments may also route a transaction associated with the communication request to a compliant communication channel based on a configuration table that is stored locally. In some embodiments, a compliant communication channel may be selected based on the level of security required for the transaction. In some embodiments, a configuration table may describe how to route particular transactions to a particular compliant communication channel. For example, the configuration table may describe the routing of particular security parameters included in the set of security parameters, where to route the transaction (e.g., routing a transaction to a compliant communication channel based on the set of security parameters, avoiding a particular communication channel and/or node based on regulated list, such as an office of foreign assets control (OFAC) advisory list, and/or the like), and if/how to encrypt different data to be transmitted via a compliant communication channel. In some embodiments, this configuration table may be implemented at the individual device level. As such, each device involved in the routing of communications may be configured to determine a security score for a received communication and be able to determine one or more security actions and use a local configuration table to route the communication. Thus, individual devices may use a configuration table to route transactions to the appropriate parties and furthermore, may eliminate the need for redundant communications between the particular computing device (e.g., a user device or a node) and other devices within the system to understand the proper methodology for doing so, thus again producing a more computationally efficient communication system with lower network latency due to the overall reduction in network bandwidth usage. Additionally, the configuration table may be monitored and updated such that communications may avoid being routed to certain devices, such as devices associated with an OFAC advisory or sanctions list. As such, entities may ensure they are in compliance with certain regulations and standards and further, that transmitted communications are kept secure.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
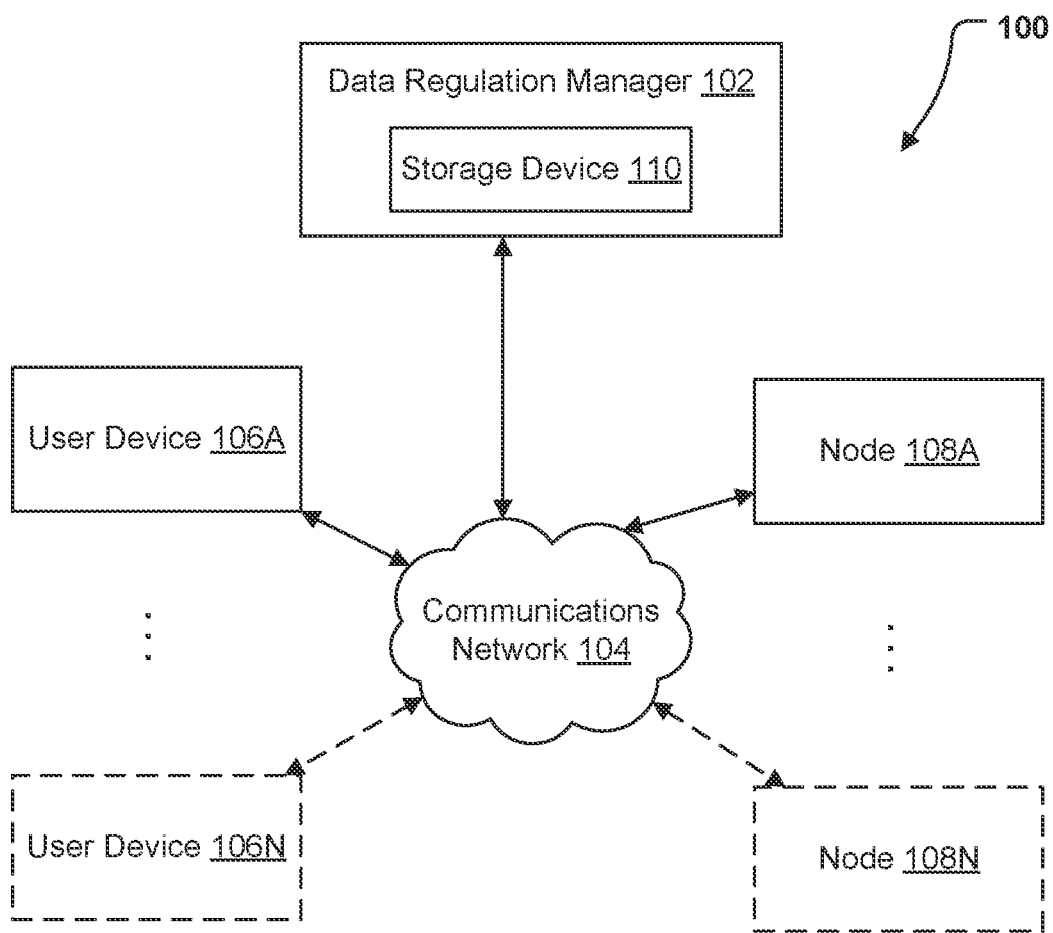
FIG. 1 illustrates a system in which some example embodiments may be used.

Some example embodiments will now be described more fully hereinafter with reference to the accompanying figures, in which some, but not necessarily all, embodiments are shown. Because inventions described herein may be embodied in many different forms, these inventions should not be limited solely to the embodiments set forth herein; rather, these various embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "transaction request" refers to an electronic request that initiates a transaction. The transaction request may indicate one or more actions requested by an individual that initiated the transaction (e.g., a purchase, withdrawal of funds, transfer of funds, the counterparty, or the like). In some embodiments, an automatic trigger event may cause a transaction request to be initiated on a computing device associated with the individual. An automatic trigger event may include a temporal trigger event, circumstantial trigger event, and/or the like. A temporal trigger event may occur in accordance with a set of rules and/or configurations that require a transaction request to be received within a particular time period or at a particular point in time. A circumstantial trigger event may occur in accordance with a set of rules and/or configurations that require that a transaction request be generated in response to a set of conditions and/or criteria being met.

The term "transaction data packet" refers to a data packet generated in response to a transaction request and that is routed via a particular compliant communication channel based on the security score associated with the transaction request. For example, the transaction data packet may comprise information retrieved by the one or more security actions, one or more security parameters (e.g., the transaction amount, time of the transaction, or the like), or the like. In some embodiments, the transaction data packet may be configured differently (e.g., applying encryption or masking methods) based on the recipient involved in the transaction.

The term "communication request" refers to an electronic request associated with a transaction. In some embodiments, the communication request may be a transaction request. In other embodiments, the communication request may be a transaction data packet. Receipt of the communication request may cause the recipient device to determine a security score and perform additional actions based on the security score.

The term "security parameter" refers to data that is included in a communication request that is used to determine a security score. In some embodiments, the set of security parameters may describe the data included in a communication request, such as the transaction amount, the recipient, or the like. In addition, the set of security parameters may include metadata about the communication request, such as the location of the computing device that received the communication request, trace signals of computing devices in proximity to the individual, the time of day when the communication request was received, and/or the like.

The term "security score" refers to a computed score describing the security associated with a communication request and is based on the set of security parameters. In some embodiments, the security score is a numerical score, which in other embodiments the security score may be converted into a categorical result (e.g., a low security category, medium security category, high security category, a numbered classification such as tier 1, tier 2, or tier 3, a color-coded classification such as green, yellow, or red, and/or the like). For example, the set of security parameters may be compared to a set of predetermined security rules that describe conditions (e.g., particular security parameter values such as transaction amount, location data, or the like) that must be met to classify the transaction into a particular categorical security score. Where the security score is a numerical score, the security score may be computed by calculating weighted numerical values for each particular security parameter included in the set of security parameters. A summation of the weighted numerical values may yield a numerical security score.

The term "security action" refers to a real-world action, step, and/or operation that relates to a transmission of data (e.g., a transaction). In some embodiments, security actions may be predetermined by an entity (e.g., an entity adjudicating the communication request). Some example security actions may include single factor authentication, multifactor authentication, alerting a third party (e.g., the recipient or regulatory body), and/or the like. In some embodiments, an automatic trigger event based on the determined security score may cause performance of a security action. An automatic trigger event may include a temporal trigger event, a circumstantial trigger event, and/or the like. A temporal trigger event may occur based on rules and/or configuration that require one or more actions to be executed within a particular time period or at a particular point in time. A circumstantial trigger event may occur based on rules and/or configurations that require one or more security actions to be executed.

The term "primary instance" refers to a data structure including data associated with an individual. The primary instance may be stored in a storage device and may be routinely referenced as a point of comparison for current instances (e.g., an authentication method caused by one or more security actions) associated with a communication request. In some embodiments, the primary instance may be associated with a time stamp indicating the length of time since the primary instance was acquired. In some embodiments, the data included in the primary instance may be updated periodically or semi-periodically such that the primary instance includes up-to-date and accurate information for the individual.

The term "compliant communication channel" refers to a logical connection that is considered appropriate for a particular transaction based on the security score associated with a corresponding communication request. The information transfer may be a digital bit stream from one computing device to another computing device via a channel of a cellular network. In some embodiments, the cellular network may be a 5G cellular network or a 6G cellular network. In some embodiments, the channels of the cellular network may be associated with a particular security score, therefore a particular compliant communication channel may only transmit data for which it offers a sufficient security score. For example, assuming categorical security scores of tier 1, tier 2, and tier 3 reflecting different levels of security, tier 1 transactions may be routed to channel A based on channel A having a sufficient security score where channels B and C do not, tier 2 transactions may be routed to channels A or B but not channel C (presuming channel C does not have a sufficient security score), and tier 3 transactions may be routed to channels A. B, or C.

The term "non-compliant communication channel" refers to a logical connection that is considered inappropriate for a particular transaction based on the security score associated with a corresponding communication request. The information transfer may be a digital bit stream from one computing device to another computing device via a channel of a cellular network. In some embodiments, the cellular network may be a 5G cellular network or a 6G cellular network. In some embodiments, the channels of the cellular network may be associated with a particular security score, therefore a particular non-compliant communication channel may be prohibited from transmitting data of a particular security. For example, assuming the categorical security scores of tier 1, tier 2, and tier 3 associated with particular communication channels A, B, and C, respectively, if tier 3 communication channels do not offer sufficient levels of security for a transaction, then channel C would be a non-compliant communication channels for transferring a communication request regarding the transaction.

The term "node parameter" refers to data that describes the performance of a particular node. For example, a node parameter may describe the strength of signal, noise of the signal, hardware components, or the like, associated with a particular node.

The term "rogue node" refers to a computing device that fails to satisfy security requirements outlined in a set of operational node rules. In some embodiments, a rogue node may be identified by satisfying and/or not satisfying particular conditions and/or thresholds included in the operational node rules. For example, the set of operational node rules may describe the operating standards for a node involved in a transaction, such as the acceptable strength of the signal associated with the node, the expected geographic location of the node, the expected hardware components of the node, or the like. If the set of node parameters indicate that a particular node fails a condition included in the set of operational node rules, the particular node is a rogue node.

A "compliant node" refers to a computing device that satisfies security requirements. In some embodiments, a set of operational node rules may describe the operating standards for a node involved in a transaction, such as acceptable strength of the signal associated with the node, the expected geographic location of the node, the expected hardware components of the node, or the like. If a particular node satisfies the conditions outlined in the operational node rules, the particular node is a compliant node.

The term "configuration table" refers to a data structure that provides routing instructions relating to various communication channels. In some embodiments, the configuration table may describe the routing of particular pieces of data included in a transaction, where to route the transaction, encryption techniques to use for different data to be transmitted via a communication channel, and/or the like. Additionally, the configuration table may describe a set of candidate nodes associated with a particular communication channel. The one or more candidate nodes may be associated with a node identifier that uniquely identifies the particular node from other nodes. In some embodiments, the node identifier may be a media access control (MAC) address, international mobile equipment identity (IMEI), serial number, or the like. In some embodiments, the configuration table may also describe currently known rogue nodes to avoid while transmitting data via a compliant communication channel.

The term "series of nodes" refers to a plurality of computing devices that are eligible to receive a transaction via a compliant communication channel to complete a communication request (e.g., intermediary nodes and/or endpoint nodes). In some embodiments, the series of nodes may be utilized to process, re-evaluate, and communicate the transaction to another computing device (e.g., an intermediary node or endpoint included in the series of nodes).

The term "set of update parameters" refers to a data structure that describes one or more updates of a particular computing device in a configuration table. In some embodiments, the set of update parameters may reflect an updated performance of a particular computing device, such as signal strength, signal noise, hardware components, or the like. For example, the set of update parameters may describe the signal strength associated with a particular node along a communication channel. In some embodiments, the set of update parameters may also describe new financial guidelines from a financial institution (e.g., a financial institution that adjudicates transactions). For example, a financial institution may determine that a hardware component that is present in a portion of the nodes in the series of nodes in communication channel A is compromised and should be avoided and thus, the set of update parameters may reflect the compromised status of the nodes and/or communication channel A.

The term "update instruction" refers to a data structure that describes an update to a configuration table. In some embodiments, the update instruction may cause a computing device to update a stored configuration table that may alter responses by the configuration table to queries relating to the routing of transactions. In some embodiments, the update instruction may be targeted instruction associated with a particular node. Alternatively, the update instruction may be associated with a plurality of computing devices.

The term "security profile" refers to a data structure that describes a set of parameters associated with a particular node. In some embodiments, the set of parameters may include signal strength, noise of the signal, geographic location of the node, hardware components, historical security incidences, a management organization, an online status (e.g., active or inactive), last usage date, communication bandwidth, and/or the like. In some embodiments, the culmination of parameters associated with a particular node may be identified and associated with a security profile associated with the particular node.

The term "update criticality" refers to a data structure that describes if an update condition included in the set of configuration update rules has been satisfied. In some embodiments, the update criticality may include one or more identified update conditions that are satisfied, which may further trigger the generation of an update instruction.

System Architecture

Example embodiments described herein may be implemented using any of a variety of computing devices or servers. To this end, FIG. 1 illustrates an example environment 100 within which various embodiments may operate. As illustrated, a data regulation manager 102 may receive and/or transmit information via communications network 104 (e.g., the Internet, cellular network, or the like) with any number of other devices, such as one or more of user device 106A through user device 106N and/or node 108A through node 108N.

The data regulation manager 102 may be implemented as one or more computing devices or servers, which may be composed of a series of components. Particular components of the data regulation manager 102 are described in greater detail below with reference to apparatus 300 in connection with FIG. 3.

In some embodiments, communications network 104 may be a 5G cellular network or a 6G cellular network. The 6G cellular network utilizes signals at the high end of the radio spectrum that may offer a data transmission rate of 1 terabyte per second. The higher frequencies leveraged by the 6G cellular network may enable a higher capacity and reduced latency. In some embodiments, the reduced latencies offered by such cellular networks may permit the transmission of data via a larger number of channels (e.g., leveraging intermediary nodes that historically may not have been able to facilitate distribution of data), and in doing so may permit enhanced parallelism via the simultaneous reception of data via a plurality of channels.

In addition, one or more computing devices (e.g., user device 106A through user device 106N and/or node 108A through node 108N) may use communications network 104 (e.g., a 6G cellular network) and leverage the benefits of a 6G cellular network to simultaneously send data to the data regulation manager 102. In some embodiments, each channel included in the plurality of channels may be dedicated to a particular authentication factor category. For example, high-security transactions may be transmitted via channel A, medium-security transactions via channel B, and low-security transactions via channel C.

In some embodiments, the data regulation manager 102 further includes a storage device 110 that comprises a distinct component from other components of the data regulation manager 102. Storage device 110 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Storage device 110 may host the software executed to operate the data regulation manager 102. Storage device 110 may store information relied upon during operation of the data regulation manager 102, such as various algorithms that may be used by the data regulation manager 102, data and documents to be analyzed using the data regulation manager 102, or the like. In addition, storage device 110 may store control signals, device characteristics, and access credentials enabling interaction between the data regulation manager 102 and one or more of the user devices 106A-106N or nodes 108A-108N.

The one or more user devices 106A-106N and the one or more nodes 108A-108N may be embodied by any computing devices known in the art. The one or more user devices 106A-106N and the one or more nodes 108A-108N need not themselves be independent devices, but may be peripheral devices communicatively coupled to other computing devices. In some embodiments, the one or more nodes 108A-108N may be associated with a unique node identifier, such as a media access control (MAC) address, international mobile equipment identity (IMEI), serial number, or the like. In some embodiments, the one or more user devices may be internet of things devices (IoT). For example, appliances, cameras, doorbells, televisions, or the like, may be one or more user devices. In some embodiments, one or more nodes of the one or more nodes 108A-108N may be associated with a particular managing entity and/or communication channel. The particular components of the one or more user devices 106A-106N and/or nodes 108A-108N are described in greater detail below with reference to apparatus 200 in connection with FIG. 2.

Example Implementing Apparatuses

Figure 2:
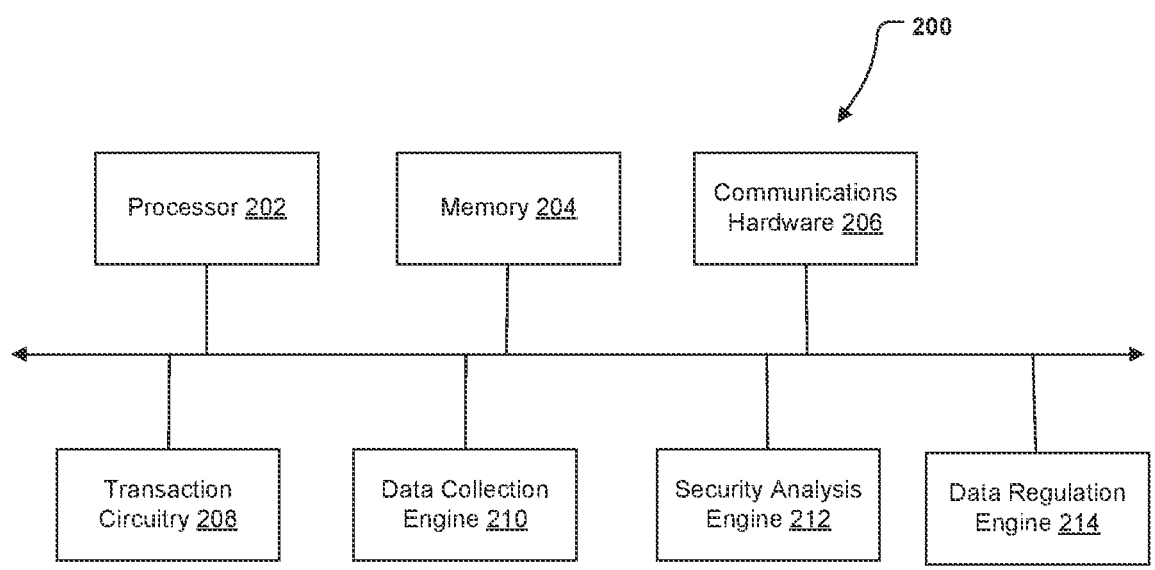
FIG. 2 illustrates a schematic block diagram of example circuitry embodying a computing device that may perform various operations in accordance with some example embodiments described herein.

The one or more user devices 106A-106N and/or nodes 108A-108N (described previously with reference to FIG. 1) may be embodied by one or more computing devices, shown as apparatus 200 in FIG. 2. The apparatus 200 may be configured to execute various operations described above in connection with FIG. 1 and below in connection with FIGS. 4-5. As illustrated in FIG. 2, the apparatus 200 may include processor 202, memory 204, communications hardware 206, transaction circuitry 208, data collection engine 210, security analysis engine 212, and data regulation engine 214 each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In particular, in some embodiments, the communications hardware 206 may be configured to transmit a transaction data packet and/or instructions to an initial node, transmit the transaction through a compliant communications channel, receive a set of update parameters, and/or distribute an update instruction. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a transaction circuitry 208 that is configured to receive a communication request. The transaction circuitry 208 may also be configured to perform one or more security actions based on a determined security score. The transaction circuitry 208 may utilize processor 202, memory 204, or any other hardware component included in the apparatus 200 to perform these operations, as described in connection with FIG. 4 below. The transaction circuitry 208 may further utilize communications hardware 206 to gather and/or receive data from a variety of sources (e.g., data regulation manager 102, nodes 108A-108N as shown in FIG. 1), and/or exchange data with a user, and in some embodiments may utilize processor 202 and/or memory 204 to any or more of the above operations.

In addition, the apparatus 200 further comprises a data collection engine 210 that is configured to identify a set of security parameters. The data collection engine 210 may also be configured to identify one or more computing devices (e.g., one or more of user device 106A through user device 106N), identify a set of candidate nodes, identify rogue nodes, identify a set of node parameters, evaluate whether a computing device satisfies a nearby device proximity parameter, and/or identify and/or store a primary instance associated with an individual. The data collection engine 210 may utilize processor 202, memory 204, or any other hardware component included in the apparatus 200 to perform these operations, as described in connection with FIG. 4 below. The data collection engine 210 may further utilize communications hardware 206 to gather data from a variety of sources (e.g., data regulation manager 102, nodes 108A-108N as shown in FIG. 1), and/or exchange data with a user, and in some embodiments may utilize processor 202 and/or memory 204 to perform any or more of the above operations.

In addition, the apparatus 200 further comprises a security analysis engine 212 that is configured to determine a security score associated with the communication request. The security analysis engine may also be configured to determine one or more security actions based on the security score, select an initial node of a compliant communication channel, query a configuration table for the initial node of the compliant communication channel, and/or compare a primary instance to a set of security parameters to produce a similarity score. The security analysis engine 212 may utilize processor 202, memory 204, or any other hardware component included in the apparatus 200 to perform these operations, as described in connection with FIGS. 4-5 below. The security analysis engine 212 may further utilize communications hardware 206 to gather data from a variety of sources (e.g., data regulation manager 102 or nodes 108A-108N, as shown in FIG. 1), and/or exchange data with a user, and in some embodiments may utilize processor 202 and/or memory 204 to perform any or more of the above operations.

Further, the apparatus 200 further comprises a data regulation engine 214 that is configured to route a transaction associated with the communication request to a compliant communication channel based on a configuration table. The data regulation engine 214 is further configured to select a particular node from a set of candidate nodes, remove a rogue node from a set of candidate nodes, determine a rogue node, and/or identify a compliant communication channel. The data regulation engine 214 may utilize processor 202, memory 204, or any other hardware component included in the apparatus 200 to perform these operations, as described in connection with FIG. 4 below. The data regulation engine 214 may further utilize communications hardware 206 to gather data from a variety of sources (e.g., data regulation manager 102 or nodes 108A-108N, as shown in FIG. 1), and/or exchange data with a user, and in some embodiments may utilize processor 202 and/or memory 204 to perform any or more of the above operations.

Although components 202-214 are described in part using functional language, it will be understood that the particular implementations necessarily include the use of particular hardware. It should also be understood that certain of these components 202-214 may include similar or common hardware. For example, the transaction circuitry 208, data collection engine 210, security analysis engine 212, and data regulation engine 214 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the transaction circuitry 208, data collection engine 210, security analysis engine 212, and data regulation engine 214 may leverage processor 202, memory 204, or communications hardware 206 as described above, it will be understood that any of transaction circuitry 208, data collection engine 210, security analysis engine 212, and data regulation engine 214 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that transaction circuitry 208, data collection engine 210, security analysis engine 212, and data regulation engine 214 comprise particular machinery designed for performing the functions described herein in connection with such elements of apparatus 200.

Figure 3:
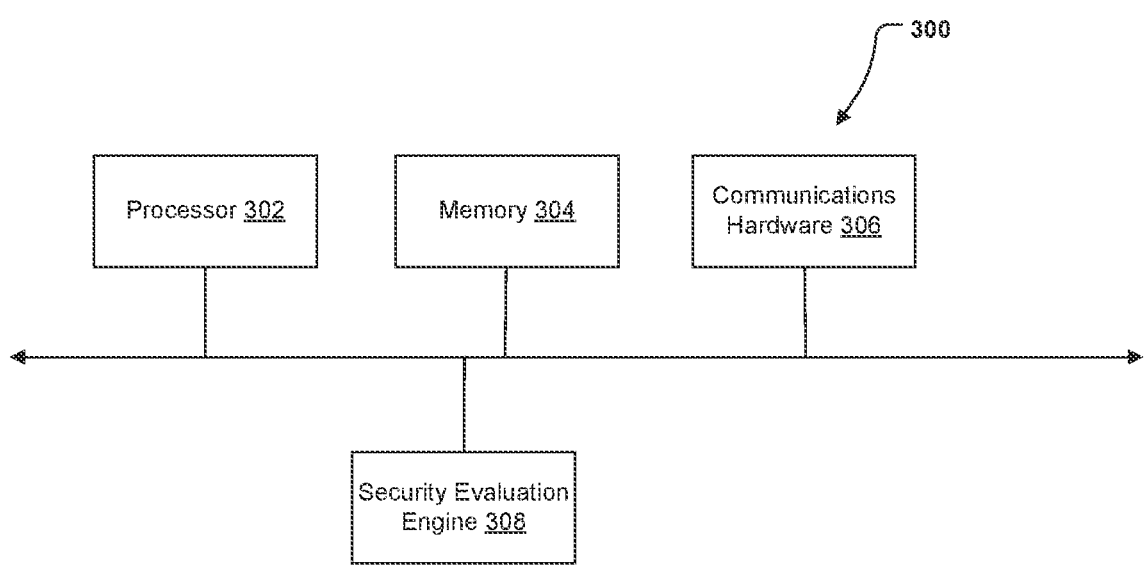
FIG. 3 illustrates a schematic block diagram of example circuitry embodying a system device that may perform various operations in accordance with some example embodiments described herein.

As illustrated in FIG. 3, an apparatus 300 is shown that represents an example data regulation manager 102. The apparatus 300 includes processing circuitry 302, memory 304, and communications hardware 306, each of which is configured to be similar to the similarly named components described above in connection with FIG. 2. However, the apparatus 300 also includes security evaluation engine 308, which includes hardware components configured to generate an update instruction for a configuration table based on the set of update parameters, identify a set of configuration update rules, generate an update criticality, and/or identify a security profile associated with a node. The security evaluation engine 308 may utilize processing circuitry 302, memory 304, or any other hardware component included in the apparatus 300 to perform these operations, as described in connection with FIGS. 6-7 below. The security evaluation engine 308 may further utilize communications hardware 306 to gather data from a variety of sources (e.g., user devices 106A-106N or nodes 108A-108N, as shown in FIG. 1), or may otherwise utilize processing circuitry 302 and/or memory 304 to perform any or more of the above operations.

As will be appreciated based on this disclosure, example embodiments contemplated herein may be implemented by an apparatus 200 or apparatus 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatuses 200 and 300, example embodiments are described below in connection with a series of flowcharts.

Figure 4:
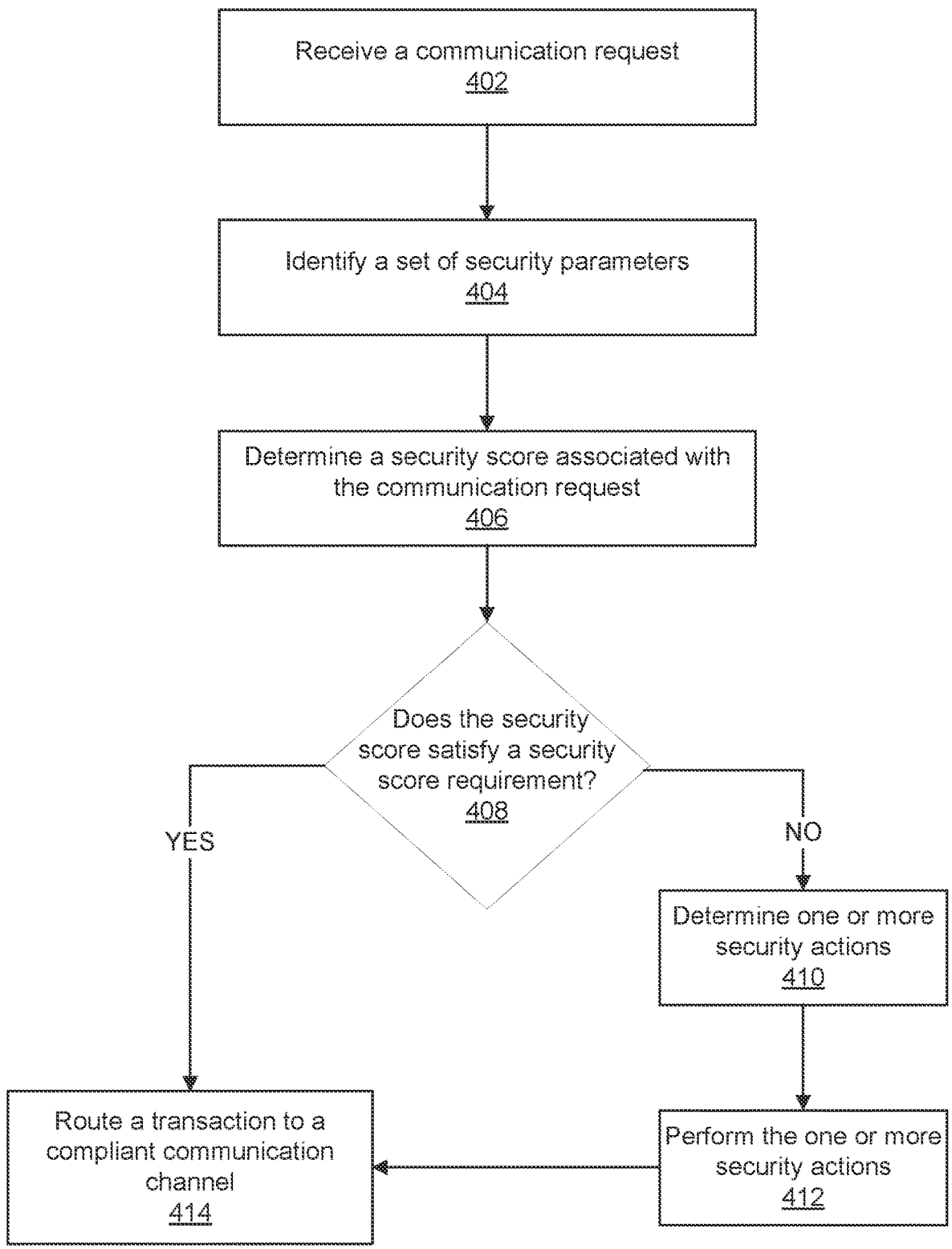
FIG. 4 illustrates an example flowchart for regulating data communication, in accordance with some example embodiments described herein.
Figure 5:
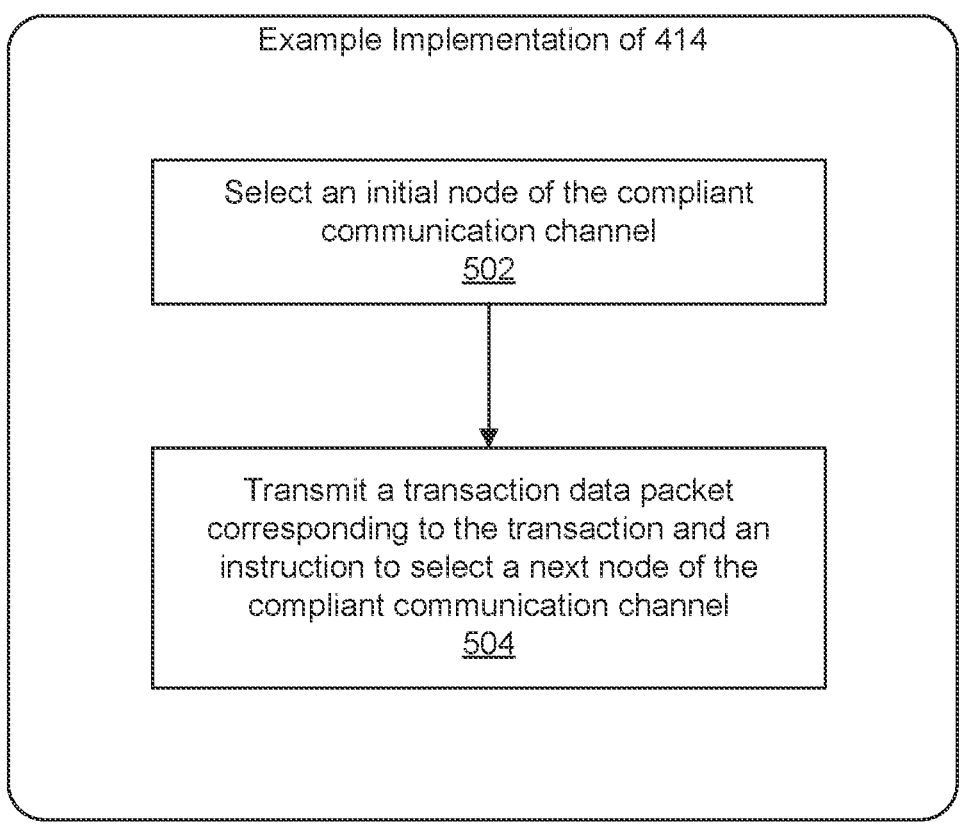
FIG. 5 illustrates an example flowchart for transmitting a transaction data packet to an initial node of the compliant communication channel, in accordance with some example embodiments described herein.

Example Operations for Regulating Data Communication Via a User Device and/or Node Turning to FIGS. 4-5, example flowcharts are illustrated that contain example operations implemented by example embodiments described herein. The operations illustrated in FIGS. 4 and 5 may, for example, may be performed by user device 106A through user device 106N and/or node 108A through 108N shown in FIG. 1, which may in turn be embodied by an apparatus 200, which is shown and described in connection with FIG. 2. To perform the operations described below, the apparatus 200 may utilize one or more of processor 202, memory 204, communications hardware 206, transaction circuitry 208, data collection engine 210, security analysis engine 212, data regulation engine 214, and/or any combination thereof.

Turning first to FIG. 4, example operations are shown for regulating data communication. In particular, the operations described by FIG. 4 enable computing devices (e.g., user devices such as any one of user device 106A-106N and/or nodes such as any one of nodes 108A-108N) to locally determine a compliant communication channel and/or node to route a communication request (e.g., a transaction request and/or a transaction data packet). In particular, these devices may utilize a configuration table that is locally stored on the device to determine where to route a transaction that is associated with a communication request. As such, these devices (e.g., user devices such as any one of user device 106A-106N and/or nodes such as any one of nodes 108A-108N) may reduce the number of communications required to facilitate a transaction or other type of communication, thereby reducing overall network bandwidth and reducing overall computational resource usage within the devices of a network.

As shown by operation 402, the apparatus 200 includes means, such as processor 202, memory 204, communications hardware 206, transaction circuitry 208, or the like, for receiving a communication request. In some embodiments, a communication request is a transaction request. The transaction request may be an electronic request that initiates a transaction. The transaction request may indicate one or more actions (e.g., a purchase, withdrawal of funds, transfer of funds, or the like) requested by an individual that initiated the transaction. In some embodiments, the communication request is a transaction request in an instance in which a transaction is first initiated on the apparatus. For example, the apparatus may be a computing device, such as a user device (e.g., any one of user devices 106A-106N) such that a user may initiate the transaction via the user device to cause the transaction request to be received.

In some embodiments, an automatic trigger event may cause a communication request to be initiated on apparatus 200. An automatic trigger event may include a temporal trigger event, circumstantial trigger event, and/or the like. A temporal trigger event may take place based on rules and/or configurations that require a communication request to be received within a particular time period or at a particular point in time. For example, a temporal trigger may be configured to have a particular user device (e.g., user device 106A, or the like) receive a communication request on the last day of the month to make a regularly scheduled payment (e.g., a rent payment).

A circumstantial trigger event may take place based on rules and/or configurations that require a communication request to be generated in response to a set of conditions and/or criteria being met. For example, a circumstantial trigger may describe that a communication request is received by a computing device associated with an individual (e.g., user device 106A, or the like) if the individual enters a payment gateway associated with a particular website.

In some embodiments, transaction circuitry 208 may receive the communication request from a local storage device (e.g., memory 204, or the like) and then subsequently cause presentation of the communication request on a computing device associated with an individual. For example, a local storage device may have a blueprint for a particular transaction request, such as a transaction request associated with a particular recipient. Alternatively, transaction circuitry 208 may receive the communication request from communications hardware 206. For example, communications hardware 206 may receive a transaction request from a third-party (e.g., the recipient, a financial institution, or the like) via a network (e.g., communications network 104, shown in FIG. 1). For example, assume an individual enters a payment gateway and attempts to make a purchase on a computing device associated with the user (e.g., user device 106A, or the like) to subscribe to a streaming service. Transaction circuitry 208 may subsequently receive the transaction request from the streaming service.

In some embodiments, the individual may be required to input data about the particular transaction (e.g., the set of security parameters, or the like). Alternatively, the data about the transaction may be automatically input into the communication request. In some embodiments, if no communication request blueprint is available and/or accessible to a computing device associated with the individual (e.g., user device 106A, or the like), a default communication request stored in a local or remote storage device (e.g., memory 204, or the like) may be received by transaction circuitry 208.

Alternatively, in some embodiments, the communication request is a transaction data packet. In some embodiments, once a communication request has been received, the recipient device may provide the transaction data packet to the apparatus 200. For example, the apparatus 200 may be a node, such as any one of nodes 108A-108N and may receive the transaction data packet from a corresponding user device associated with a user who initiated the transaction. As another example, the apparatus 200 may be a node, such as any one of nodes 108A-108N and may receive the transaction data packet from a different node (e.g., any one of nodes 108A-108N).

As shown by operation 404, the apparatus 200 includes means, such as processor 202, memory 204, communications hardware 206, data collection engine 210, or the like, for identifying, based on the communication request, a set of security parameters. In some embodiments, the set of security parameters may describe the data included in the communication request, such as the transaction amount, the recipient, or the like. In addition, the set of security parameters may include metadata about the communication request, such as the location of the computing device that received the communication request, trace signals of computing devices in proximity to the individual, the time of day when the communication request was received, and/or the like.

The data collection engine 210 may use any suitable techniques to identify the set of security parameters from the communication request, such as optical character recognition (OCR), intelligent character recognition (ICR), natural language processing (NLP), searching algorithms, machine learning models, and/or the like. In some embodiments, data collection engine 210 may OCR any data in the communication request, if needed, and then search for an indicator for a security parameter to append to the set of security parameters. For example, data collection engine 210 may search for the term's "amount", "transaction amount", or the like, which may act as an identifier to identify a security parameter associated with the amount of money included in the communication request. In another example, the communication request may comprise a handwritten check. The data collection engine 210 may perform an ICR technique for any data in the communication request to search for characters indicative of the check recipient, such as by processing handwritten text on a "pay to the order of" line, or characters indicative of a payment amount, such as by processing handwritten text on a "payment amount" box or line, to identify a set of security parameters associated with the handwritten check. In some embodiments, the data collection engine 210 may also search for metadata about the communication request to identify the set of security parameters. For example, metadata about the communication request, such as the time of day the request was received, the location and/or identity of the computing device (e.g., user device 106A, node 108A, or the like) that provided the communication request, or the like, may also be identified and included in the set of security parameters.

In some embodiments, data collection engine 210 may search for traces of one or more computing devices located within a predefined proximity of the apparatus 200. A predefined proximity may be defined by a nearby device proximity parameter that specifies a predetermined range (e.g., 50-foot radius) around the particular apparatus 200 (e.g., user device 106A, node 108A, etc.). In some embodiments, the predefined proximity may also define additional conditions aside from the nearby device proximity parameter, such as a condition that may require the one or more computing devices within the predetermined range (specified by the nearby device proximity parameter) to be connected to the same network (e.g., communications network 104, FIG. 1) as apparatus 200.

In some embodiments, the data collection engine 210 may evaluate whether the one or more computing devices satisfy a nearby device proximity parameter. The nearby device proximity parameter may define a threshold that must be satisfied for a computing device to be considered within a predefined proximity to the apparatus 200. For example, the nearby device proximity parameter may define a predetermined range, such as a 25-foot radius about the apparatus 200. The data collection engine 210 may search for indication of the location of one or more computing devices within proximity to the apparatus 200. For example, the data collection engine 210 may use Bluetooth, near-field communication (NFC), wireless communications, and/or the like to triangulate or otherwise determine a location of a computing device and further, determine whether the location satisfies the nearby device proximity parameter.

In some embodiments, data collection engine 210 may determine the one or more computing devices that may satisfy the nearby device proximity parameter by searching a storage device (e.g., storage device 110, or the like) for location data about one or more computing devices determined to be within proximity of a location corresponding to the apparatus 200. For example, the data collection engine 210 may determine the GPS coordinates of the apparatus 200 and query the storage device to determine the GPS coordinates of other computing devices to determine the location of other computing devices. Further, the data collection engine 210 may calculate the difference in location of apparatus 200 and the one or more computing devices to determine whether the one or more computing devices satisfy the defined nearby device proximity parameter and thereby determine whether to include the one or more computing devices in the set of security parameters based on the one or more computing devices satisfaction of the defined nearby device proximity parameter.

In some embodiments, data collection engine 210 may also search for security parameters that indicate trace signals of one or more computing devices (e.g., user device 106N, or the like) associated with the individual that have been or currently are connected to the apparatus 200. For example, the data collection engine 210 may identify that apparatus 200 was connected or is currently connected to one or more computing devices, such as the individual's smart watch, smart television, smart refrigerator, home speaker system, and/or the like and incorporate the trace signals of the one or more computing device into the set of security parameters. In some embodiments, computing devices which are connected or have been connected to apparatus 200 within a particular time frame (e.g., within 24 hours), may be included as computing devices even in an instance in which the location of the computing device fails to satisfy the nearby device proximity parameter.

As shown by operation 406, the apparatus 200 includes means, such as processor 202, memory 204, communications hardware 206, security analysis engine 212, or the like, for determining a security score associated with the communication request. In some embodiments, the security score is based on the set of security parameters. In some embodiments, the security score may be a numerical score, which in other embodiments the security score may be converted into a categorical result (e.g., a low security category, medium security category, high security category, a numbered classification such as tier 1, tier 2, or tier 3, a color-coded classification such as green, yellow, or red, and/or the like). For example, the set of security parameters may be compared to a set of predetermined security rules that describe conditions and/or thresholds (e.g., particular security parameter values, such as transaction amount, location data, or the like) that must be met to classify the transaction into a particular categorical security score. Where the security score is a numerical score, the security score may be computed by calculating weighted numerical values for each particular security parameter included in the set of security parameters. A summation of the weighted numerical values may yield a numerical security score. For example, assume the predetermined security rules describe weighting the transaction amount more than the location of the computing device that received the communication request. The transaction amount may then be weighted more heavily than the location of the computing device (e.g., user device 106A) that received the communication request (operation 402).

In some embodiments, security analysis engine 212 may leverage a machine learning model to determine the security score associated with the communication request. In some embodiments, the machine learning model may determine the security score based on observed trends for other communication requests. The machine learning model may track real-time communication requests, such as transaction requests, to determine and/or identify fraudulent patterns, such as money laundering. For example, a known fraudulent pattern associated with common money laundering trends, may include initiating multiple transaction to blend illicit money with legitimate money, constant motion of funds from one account to another, and/or the like. The machine learning model may evaluate the communication request and/or one or more previous communication requests received from the user and/or user device associated with the communication request and determine a risk score for the communication request based on a similarity between the communication request and/or previous communication request to known fraud patterns. The risk score may reflect a likelihood that the communication request is part of a fraudulent pattern, such as money laundering. The risk score may in turn impact the security score associated with the communication request (e.g., through a weighted average). In this regard, the machine learning model may assess a risk associated with the communication request, such as an anti-money laundering (AML) risk. Additionally or alternatively, the model or an additional model may be a rules-based model that receives the identified set of security parameters (operation 404) as an input and outputs a security score, which may be a categorical security score. In addition, the model may be input the predetermined security rules, which may be stored and retrieved from a storage device (e.g., storage device 110, memory 204, or the like). The predetermined security rules may describe conditions (e.g., thresholds, ranges, and/or values of the set of security parameters) required to associate a particular security score with a communication request. For example, assume (i) the set of security parameters associated with the communication request includes a transaction amount of $10,000 and (ii) the predetermined security rules describe a high-security transaction as including any transaction amount over $1,000. The rules-based model may then determine that the communication request is classified as high-security based on the transaction amount included in the communication request.

In some embodiments, security analysis engine 212 may also input a primary instance associated with an individual into the model to determine a security score. The primary instance may include historical data (e.g., previous locations of one or more computing devices) associated with an individual that may be used for comparison to determine the authenticity of a communication request. In this regard, the primary instance may also contribute to the security score associated with the communication request. In some embodiments, the primary instance may be associated with a time stamp that is indicative of the length of time since the primary instance was generated or otherwise acquired. In some embodiments, the data included in the primary instance may be updated periodically or semi-periodically such that the primary instance includes up-to-date and accurate information for the individual.

In some embodiments, the primary instance associated with the individual may be identified or otherwise obtained using a user identifier. A user identifier may uniquely identify the individual associated with apparatus 200 from other individuals. In some embodiments, the user identifier is also associated with user attributes such that the user identifier may be identified using one or more of these user attributes. For example, user attributes may include a username, phone number, email address, social security number, and/or the like that may be used to query a data repository (e.g., storage device 110, memory 204, or other storage device) configured to store the user identifier and associated primary instance.

In some embodiments, the primary instance may be stored in a storage device (e.g., memory 204, or the like) and referenced by the security analysis engine 212 to compare current instances (e.g., the set of security parameters) associated with a transaction to the primary instance. For example, assume a primary instance describes the computing devices associated with an individual (e.g., user device 106A, user device 106N, or the like). If a communication request is transmitted to a computing device not associated with the individual (e.g., an individual uses a friend's laptop to initiate a transfer of funds) the data collection engine 210 may compare the primary instance of one or more computing devices associated with the individual to the traces of one or more computing devices present in the communication request to identify the use of another computing device and the surrounding computing devices and may use this data to negatively impact the security score associated with the communication request.

As shown by operation 408, the apparatus 200 includes means, such as processor 202, memory 204, communications hardware 206, security analysis engine 212, or the like, for determining if the security score satisfies a security score requirement. In some embodiments, the determined security score (e.g., high-security, low-security, or the like) may be associated with a particular communication channel (e.g., a compliant communication channel) of a 6G cellular network or a 5G cellular network (e.g., communications network 104) via a security score threshold or acceptable range (e.g., a security score between 80-89). For example, high-security transactions may be transmitted via channel A, medium-security via channel B, and low-security via channel C. In some embodiments, each communication channel may be associated with a security score requirement, such as a particular security score associated with a communication request, security score range, and/or threshold to use a particular communication channel (e.g., a compliant communication channel).

In some embodiments, the security score associated with the communication request may be required to satisfy a security score threshold to use a compliant communication channel, which may cause the computing device that received the communication request to route the transaction to the compliant communication channel (described below in relation to operation 414). Alternatively, if the security score associated with the communication request fails to satisfy a security score requirement associated with using a compliant communication channel, the computing device that received the communication request may determine one or more security actions and subsequently cause performance of the one or more security actions to enhance the security (e.g., raise the security score) associated with the communication request, which may enable the transaction to be routed to a compliant communication channel. Determining and performing the one or more security actions is described below in relation to operation 410 and operation 412.

As shown by operation 410, the apparatus 200 includes means, such as processor 202, memory 204, communications hardware 206, security analysis engine 212, or the like, for determining one or more security actions. If a security score associated with a particular transaction fails to meet the security requirement (e.g., security score threshold) associated with a compliant communication channel, security analysis engine 212 may determine one or more security actions to perform. In some embodiments, performance of the one or more security actions by the security analysis engine 212 may enable (e.g., by raising the security score) the transaction to be routed to a compliant communication channel despite the initial security score associated with the communication request failing to satisfy the security requirement associated with the compliant communication channel. As a result, security analysis engine 212 may query the predetermined security rules to determine the one or more security actions that may enable the data communication via the compliant communication channel.

In some embodiments, the predetermined security rules may be stored in a storage device (e.g., storage device 110, memory 204, or the like). The security analysis engine 212 may use any suitable technique to identify the one or more security actions associated with a compliant communication channel, such as OCR, NLP, searching algorithms, machine learning models, and/or the like. In some embodiments, security analysis engine 212 may OCR any data in the predetermined security rules, if needed, and then search for an indicator for one or more actions associated with a particular compliant communication channel. For example, security analysis engine 212 may search for the term's "compliant communication channel", "security score", or the like, which may act as an identifier to identify a particular compliant communication channel.

The predetermined security rules may store the compliant communication channel and, assuming a low security score, the one or more security actions required to use the compliant channel in the form of key-value pairs where the key portion specifies the compliant communication channel, and the value portion specifies the one or more security actions required to be performed to use the compliant communication channel. For example, security analysis engine 212 may search for compliant communication channel A, which may be a key that is associated with the one or more security actions, such as a multifactor authentication method that is required to use communication channel A.

Some example one or more security actions may be single factor authentication, multifactor authentication, alerting a third party (e.g., the recipient or a regulatory body), or the like. In some embodiments, an automatic trigger event may cause the one or more security actions. A computing device associated with the user (e.g., user device 106A) may be configured to recognize a variety of automatic triggers. An automatic trigger event may include a temporal trigger event, a circumstantial trigger event, and/or the like.

In some embodiments, a temporal trigger event may take place based on rules and/or configurations that require one or more security actions to be executed within a particular time period or at a particular point in time. For example, historically an individual may have never initiated transactions between 12:00 am and 6:00 am. If a transaction is initiated between 12:00 am and 6:00 am, a temporal trigger may be activated, which may determine one or more security actions that the individual may be required to complete to use a particular compliant communication channel to complete the transaction. A circumstantial trigger event may take place based on rules and/or configurations that require one or more security actions to be performed. A circumstantial trigger may involve determining one or more security actions to perform based on the value of a particular security parameter included in the communication request, such as the transaction amount, or the transaction type (e.g., a transfer of funds, withdrawal of funds, or the like), and/or based on a particular security score. For example, assume a circumstantial trigger is set to be activated if the transaction amount is over $10,000. If an individual initiates a transfer of funds of $15,000, the circumstantial trigger may be activated causing multifactor authentication methods (e.g., fingerprint scan and a one-time password, or the like).

As shown by operation 412, the apparatus 200 includes means, such as processor 202, memory 204, communications hardware 206, transaction circuitry 208, or the like, for performing the one or more security actions. In some embodiments, the one or more security actions may be performed by apparatus 200. Alternatively, the one or more security actions may be performed by another computing device associated with the individual and/or apparatus 200 (e.g., user device 106N, or the like). For example, an individual may initiate a communication request on apparatus 200 (e.g., user device 106A) that does not have a camera that can perform facial recognition authentication methods, and therefore a facial recognition authentication method may be sent to the individual's mobile phone (e.g., user device 106N) that has the capability to perform such authentication methods.

In some embodiments, transaction circuitry 208 may store the results (e.g., current instances of authentication factors) from the one or more security actions. For example, the one or more security actions may be stored in a memory (e.g., memory 204, or the like) of the apparatus 200. Alternatively, the results from performing one or more security actions may be transmitted from the computing device that performed the one or more security actions to apparatus 200. For example, in the above example where the communication request was received on apparatus 200 (e.g., a desktop computer) and the facial scan was performed on a mobile phone, apparatus 200 may receive the facial scan data from the mobile device via a cellular network (e.g., a 6G cellular network such as communications network 104, shown in FIG. 1).

In some embodiments, following the acquisition of an authentication factor by performing one or more security actions, the transaction circuitry 208 may produce a similarity score based on the comparison of the primary instance with the acquired one or more authentication factors. For example, the transaction circuitry 208 may compare an authentication factor that was recently captured, such as a facial image, and compare the facial image to a stored facial image (e.g., stored in memory 204, or the like). Transaction circuitry 208 may leverage a similarity scoring model to produce a similarity score. The similarity scoring model may be configured to process authentication factors from a primary instance and authentication factors from a current instance to generate a similarity score that is indicative of similarity between the authentication factors from a primary instance and authentication factors from a current instance. For example, when the authentication factors that are compared are multimedia, the similarity scoring model may utilize a hash function to map data (e.g., authentication factors from a primary instance and authentication factors from a current instance) of an arbitrary size to fixed-size values. The similarity scoring model may use a locally sensitive hash function that allows for the comparison of multimedia using its computed hash value. For example, the similarity scoring model may implement a perceptual hash function that is analogous if features of a multimedia are similar.

In some embodiments, a perceptual hash function may use a block hash method that converts multimedia to grayscale, resizes the multimedia to a predefined target size (e.g., 16×16 pixels), flips the multimedia to identify the brightest corner, and binarizes the data through a conversion of the grayscale pixels to black and white pixels using a threshold. The binarized data may be input into an array, which describes the multimedia. The similarity scoring model may use the array for comparison against arrays of other multimedia to determine similarity between two different multimedia. For example, if the primary instance includes a facial image and the current instance includes an image captured from the computing device that received the communication request (e.g., user device 106A), the block hash method may generate two arrays, the first array for the facial image from the primary instance and a second array for the facial image captured by the computing device that received the communication request.

In some embodiments the similarity scoring model may then use the difference between the arrays to generate a Hamming distance, which may be used to generate a similarity score. In some embodiments, the similarity score may contribute to the security score associated with a communication request. For example, if a communication request is determined based on the set of security parameters to be a medium-security transaction but, the biometric authentication factors received a low security score, the security score associated with the communication request may be readjusted. It will be appreciated that other methods for calculating similarity may be used in various embodiments.

In some embodiments, the one or more security actions may result in a failed one or more security actions. In some embodiments, a failed one or more security actions may be caused by a low similarity score between the captured authentication factor and the authentication factor included in the primary instance. In addition, a failed one or more security actions may be caused by the individual and/or computing device that receives the request to perform one or more security actions not performing the one or more security actions. As a result of the failure, the communication request may be aborted, the communication request may be re-received, a prompt may alert the individual associated with the communication request that a communication request failure occurred, or the like.

Finally, as shown by operation 414, the apparatus 200 includes means, such as processor 202, memory 204, communications hardware 206, data regulation engine 214, or the like, for routing, based on a configuration table, a transaction associated with the communication request to a compliant communication channel. A configuration table may be a data structure that that provides routing instructions for transactions various communication channels. In some embodiments, the configuration table may describe the routing of particular pieces of data included in the transaction, where to route the transaction, encryption techniques to use for different data to be transmitted via a communication channel, and/or the like. Additionally, the configuration table may describe one or more candidate nodes associated with a particular communication channel. The one or more candidate nodes may be associated with a node identifier that uniquely identifies the particular node from other nodes. In some embodiments, the node identifier may be a media access control (MAC) address, international mobile equipment identity (IMEI), serial number, or the like. In some embodiments, the configuration table may also describe currently known rogue nodes to avoid while transmitting data via a compliant communication channel.

In some embodiments, the configuration table may be hosted locally on a computing device associated with the individual. For example, copies of the configuration table may be stored in a storage device, such as memory 204 or the like. Data regulation engine 214 may use any suitable techniques to identify data included in the configuration table, such as OCR, NLP, searching algorithms, machine learning models, and/or the like. In some embodiments, data regulation engine 214 may OCR any data in the configuration table, if needed, and then search for an indicator for the compliant communication channel. For example, data regulation engine 214 may search for the term "high-security", which may act as an identifier to identify a compliant communication channel for transmitting high-security data. Subsequently, the data regulation engine 214 may search the configuration table for a compliant node associated with the identified compliant communication channel.

In some embodiments, the stored configuration table may be a copy of a remotely hosted master configuration table. For example, a master configuration table may be hosted remotely on a cloud, a third-party, data regulation manager 102, particular nodes, or the like. In some embodiments, data regulation engine 214 may utilize communications hardware 206 to query data from the master configuration table and update the locally stored configuration table accordingly. For example, data regulation engine 214 may generate a transaction data packet comprising a variety of data (e.g., a key, authentication information, or the like) such that the entity or a computing device hosting the master configuration table remotely may allow data regulation engine 214 to retrieve data from the master configuration table. In some embodiments, apparatus 200 may automatically receive data pertaining to the master configuration table from the corresponding entity and/or computing device by communications hardware 206. Data regulation engine 214 may then update the locally stored configured table based on the received data. As such, the locally stored configuration table may be up-to-date and accurate such that apparatus 200 may route the transaction via the appropriate communication channels and to the appropriate nodes.

In some embodiments, the transaction that is routed based on the configuration table may be a data structure derived from the communication request. The data structure may include the required data to facilitate a transaction between the individual and the recipient. For example, assume the set of security parameters associated with a communication request describe the date of the transaction, the time of the transaction, location data, the recipient, payment method, or the like. The transaction data structure may then include the date and time of the transaction, the location of the transaction, the recipient, the payment method, or the like. In some embodiments, data regulation engine 214 may store the transaction data structure in a storage device (e.g., memory 204) until the transaction is subsequently routed to a compliant communication channel.

Turning to FIG. 5, example operations are shown for selecting an initial node from a set of candidate nodes associated with a compliant communication channel and transmitting the transaction data structure via a cellular network (e.g., a 5G cellular network or a 6G cellular network, as shown by FIG. 1)

As shown by operation 502, the apparatus 200 includes means, such as processor 202, memory 204, communications hardware 206, security analysis engine 212, or the like, for selecting, based on the configuration table, an initial node (e.g., node 108A) from a set of candidate nodes (e.g., node 108B through node 108N) associated with a compliant communication channel. In some embodiments, the compliant communication channel may include a series of nodes (e.g., node 108A through node 108N, shown in FIG. 1). In some embodiments, the series of nodes may describe a plurality of computing devices that are eligible to receive a transaction via a compliant communication channel to complete a communication request (e.g., intermediary nodes and/or endpoint nodes). The series of nodes may geographically span from the computing device (e.g., user device 106A, or the like) that received the communication request to a financial institution and/or computing device associated with a financial institution that adjudicates the transactions. In some embodiments, the series of nodes may be connected in a point-to-point connection between nodes, where each node may be redistribution points or a communication endpoint. In some embodiments, the signal between nodes in the series of nodes may be bi-directional allowing for communication to and from each node included in the series of nodes. In some embodiments, the initial node may be the closest geographical node to the computing device associated with the individual (e.g., user device 106A) that received the communication request.

In some embodiments, the security analysis engine 212 may utilize a model to determine the initial node of the compliant communication channel from a set of candidate nodes. For example, the location of the computing device that received the communication request, which may be a security parameter included in the set of security parameters, the security score associated with the communication request, and the compliant communication channel obtained from the configuration table may be input into a model to determine the initial node. In some embodiments, the model may output the initial node associated with the compliant communication channel by determining (e.g., calculating) the node included in the series of nodes of the compliant communication channel within the closest proximity to the computing device associated with the individual that received the communication request. The model may also account for other parameters associated with the node (e.g., node parameters), such as signal strength, signal noise, hardware components, or the like, and determine the initial node by computing a weighted score associated with each parameter.

In some embodiments, security analysis engine 212 may query the configuration table for the initial node of the compliant communication channel. For example, the configuration table associated with a particular computing device (e.g., user device 106A) may contain instruction for the initial node selection associated with a particular compliant communication channel. The instruction may include the particular node and/or the instruction may include how to weight each node parameter associated with the series of nodes to select a compliant initial node. After the querying, the security analysis engine 212 may be presented a set of candidate nodes. In some embodiments, security analysis engine 212 may query a database (e.g., stored in a local storage device, such as memory 204, or stored in the data regulation manager 102, such as in storage device 110, or the like) for identifying a set of node parameters associated with the set of candidate nodes. The set of node parameters may describe all the node parameters associated with each selectable node, such as the geographic location of a node, hardware components, signal strength, noise of the signal, or the like.

In some embodiments, the set of node parameters may also include data used in the identification of rogue nodes. In some embodiments, rogue nodes may include nodes that appear to be compliant (e.g., compliant nodes) based on the particular set of node parameters associated with the apparent compliant node, however, if a particular node is located in a particular location or owned by particular entities and/or particular individuals associated with an office of foreign assets control (OFAC) advisory list, the particular node may be identified as a rogue node. As such, entities may ensure they are in compliance with certain regulations and standards while also maintaining the security of the data in the communication request. In addition, rogue nodes may be identified by identifying abnormalities in the set of node parameters. For example, the data regulation engine 214 may apply a rules-based model on the set of node parameters associated with the set of candidate nodes. The rules-based model may identify rogue nodes if the node parameters associated with a particular node fail to satisfy any predetermined node rules (referred to hereinafter as operational node rules). For example, an operational node rule may describe a condition that the node must satisfy a particular signal strength threshold (e.g., a predefined decibel range). If a node in the set of candidate nodes does not meet the signal strength threshold predefined in the operational node rules, the node may be identified as a rogue node.

Further, the data regulation engine 214 may determine that either the rogue node be removed from the set of candidate nodes or that the rogue node remains in the set of candidate nodes. In addition, data regulation engine 214 may determine that the security requirement associated with routing the transaction to the particular rogue node may be readjusted. For example, if a signal strength for a particular node is below a threshold determined by the operational node rules, the data regulation engine 214 may require the performance of an additional one or more security actions (e.g., encryption, data masking, an authentication method, or the like) to protect the transaction transmitted on the compliant communication channel to the rogue node.

As shown by operation 504, the apparatus 200 includes means, such as processor 202, memory 204, communications hardware 206, or the like, for transmitting to the initial node a transaction data packet corresponding to the transaction and an instruction to select a next node of the compliant communication channel associated with the transaction. In some embodiments, the transaction data packet based on the transaction may abide by a communication protocol described in the configuration table. The communication protocol may describe the rules, syntax, semantics, error recovery methods, and/or the like when transmitting data about a transaction (e.g., a transaction data packet) to an entity to complete a transaction. The communication protocol may differ based on the compliant communication channel, recipient, and/or the like.

In some embodiments, the transaction data packet may further include instruction to select a next node of the compliant communication channel from a set of candidate nodes. The instruction may be received by the initial node that is identified in operation 502 and, the initial node may select the next node included in the set of candidate nodes along the compliant communication channel until the endpoint is reached. In some embodiments, the transaction data packet may also include indication of the set of security parameters (operation 404), the security score, and the one or more security actions (operation 410) that were previously executed.

In some embodiments, the second node (e.g., the next node after the initial node in the series of nodes along the compliant communication channel) may receive the transaction data packet from the initial node. The second node may use any suitable techniques to identify indication of the set of security parameters, the one or more security actions, the compliant communication channel previously used, and/or the like, such as optical character recognition (OCR), natural language processing (NLP), searching algorithms, machine learning models, and/or the like. For example, the node may OCR any data in the transaction data packet, if needed, and then search for an indicator of the set of security parameters. For example, the node may search for the term "security score", which may act as an identifier to identify the security score associated with the transaction.

In some embodiments, the next node (e.g., a candidate node selected from the set of candidate nodes) may re-evaluate the compliant communication channel associated with the transaction. For example, the next node may utilize the data included in the transaction data packet, such as a security score, and reference a configuration table that is hosted locally or remotely to evaluate the compliant communication channel associated with the transaction. In some embodiments, after the evaluation of the next node in the compliant communication channel, the next node may transmit the transaction data packet and instruction to select the subsequent next node within the compliant communication channel.

In some embodiments, the operations described in FIGS. 4-5 may be repeated until an appropriate node receives the communication request and is able to perform the transaction. Once the node (e.g., any one of nodes 108A-108N)

completes the transaction, which may be completed based on the information included in the transaction data packet, the node may provide a transaction notification to the originating device (e.g., any one of user device 106A-106N) indicative that the transaction has been completed.

Example Operations for Regulating Data
Communication Via the Data Regulation Manager The various operations described in connection with FIGS. 6-7 may be performed by data regulation manager 102, which may in turn be embodied by an apparatus 300, which is shown and described in connection with FIG. 3. To perform the operations described below in connection to FIG. 6, the apparatus 300 may utilize one or more of processing circuitry 302, memory 304, communications hardware 306, security evaluation engine 308, and/or any combination thereof.

Figure 6:
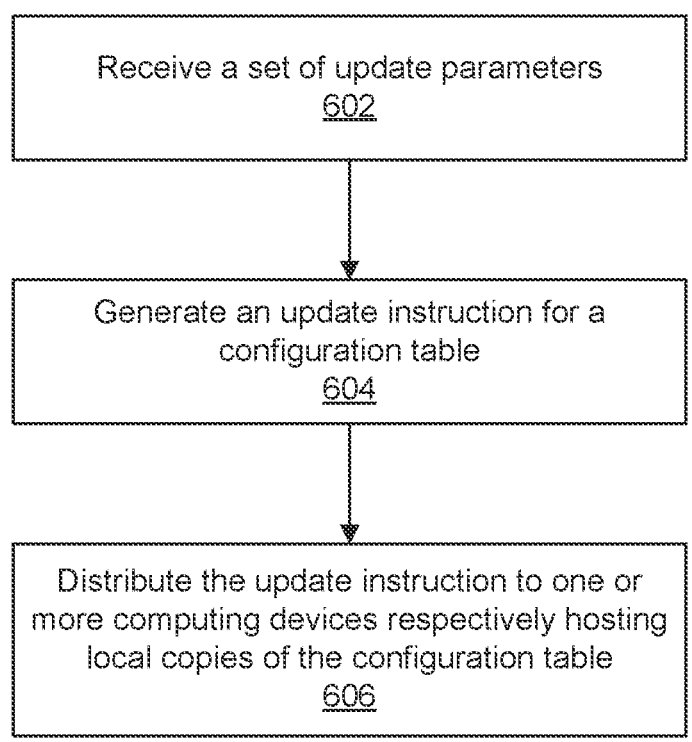
FIG. 6 illustrates another example flowchart for updating configuration of computing devices, in accordance with some example embodiments described herein.
Figure 7:
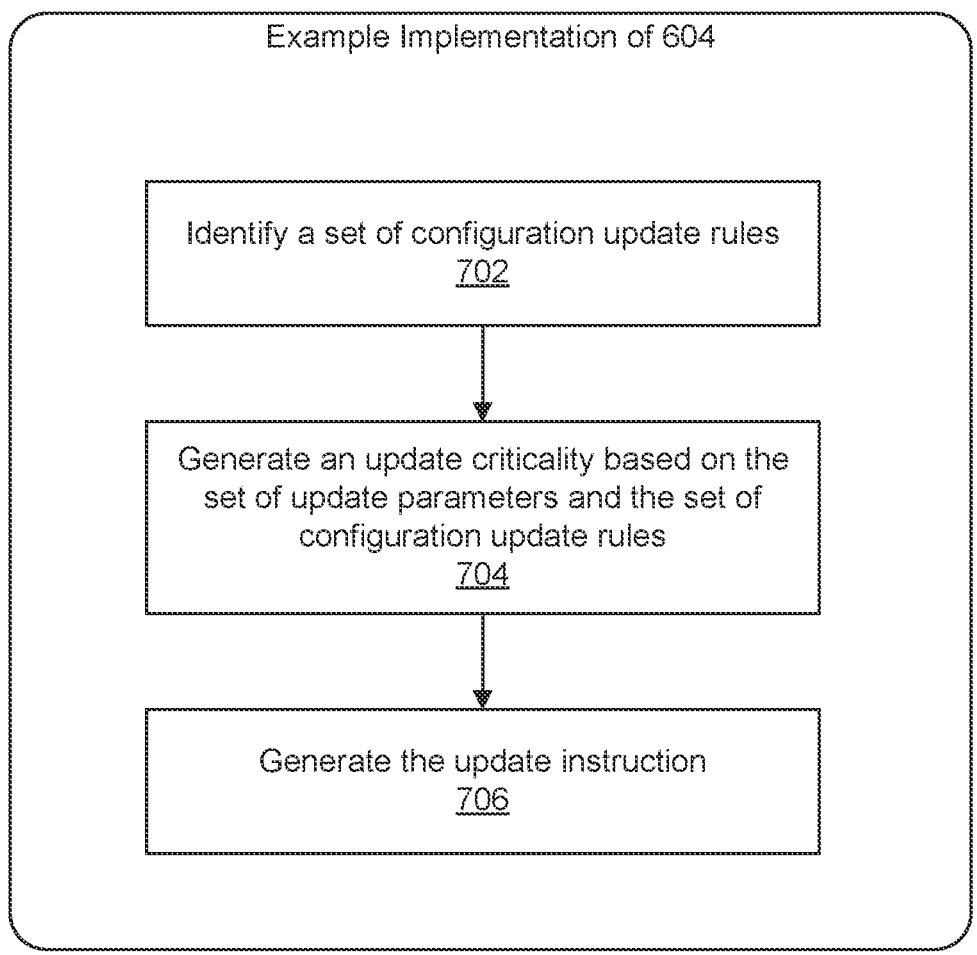
FIG. 7 illustrates another example flowchart for generating an update instruction, in accordance with some example embodiments described herein.

Turning to FIG. 6, example operations are shown for updating configuration of computing devices. The various operations described below in connection with FIGS. 6-7 may be performed by data regulation manager 102, which may in turn be embodied by an apparatus 300, which is shown and described in connection with FIG. 3. To perform the operations described below in connection to FIG. 6, the apparatus 300 may utilize one or more of processing circuitry 302, memory 304, communications hardware 306, security evaluation engine 308, and/or any combination thereof.

As shown by operation 602, the apparatus 300 includes means, such as processing circuitry 302, memory 304, communications hardware 306, security evaluation engine 308, or the like for receiving a set of update parameters. The set of update parameters may be data describing the performance of a particular computing device, such as signal strength, signal noise, hardware components, or the like. For example, the set of update parameters may describe the signal strength associated with a particular node (e.g., node 108A) along a communication channel. In some embodiments, the set of update parameters may also describe new financial guidelines from a financial institution (e.g., a financial institution that adjudicates transactions). For example, a financial institution may determine that a particular hardware component presents a security concern (e.g., a manufacturing defect), and that particular hardware component is present in a portion of the nodes in the series of nodes in communication channel A. As a result, the set of update parameters may describe the nodes with the particular hardware component to avoid and to remove particular computing devices (e.g., node 108A, or the like) that include the hardware component from the set of compliant nodes, flag the particular computing devices as rogue nodes, only allow low security transactions to be transmitted to the particular computing devices, and/or the like.

In some embodiments, the set of update parameters may be transmitted from a computing device (e.g., user device 106A, node 108A, or the like) connected to a cellular network (e.g., a 5G cellular network or a 6G cellular network such as communications network 104, shown in FIG. 1). The communications hardware 306 of the apparatus 300 may receive and store the set of update parameters in a local storage device (e.g., memory 304, storage device 110, or the like). For example, assume an individual wishes to increase the overall security associated with conducting transactions from their computing devices. The individual may then use a computing device (e.g., user device 106A, or the like) to transmit a request to the apparatus 300 (e.g., communications hardware 306) that includes a set of update parameters. For example, an individual may request to route future transactions over $1,000 to a particular communication channel that is primarily used for high-security transactions, applying particular multifactor authentication methods, and/or the like.

Additionally or alternatively, the set of update parameters may be received from a computing device (e.g., user device 106A, or the like) in response to activation of an automatic triggering event. An automatic trigger event may include a temporal trigger event, a circumstantial trigger event, and/or the like. A temporal trigger event may take place based on rules and/or configurations that cause a set of update parameters to be transmitted from a computing device (e.g., user device 106A, node 108A, or the like) within a particular time period or at a particular point in time. For example, communications hardware 306 may periodically (e.g., monthly) receive a set of update parameters from a particular node (e.g., node 108A) comprising a set of node parameters associated with the particular node via a communication channel of a cellular network (e.g., communications network 104, shown in FIG. 1).

In some embodiments, a circumstantial trigger event may take place based on rules and/or configurations that require that a set of update parameters be transmitted from a particular computing device or plurality of computing devices in response to a set of conditions and/or criteria being met. For example, if the signal strength of a particular node (e.g., node 108A) is compromised (e.g., lower than its usual baseline signal strength), upon detection of the weaker signal strength, the particular node may automatically transmit a set of update parameters to the apparatus 300 (e.g., communications hardware 306) via a cellular network (e.g., a 5G cellular network or a 6G cellular network such as communications network 104, shown in FIG. 1).

As shown by operation 604, the apparatus 300 includes means, such as processing circuitry 302, memory 304, communications hardware 306, security evaluation engine 308, or the like, for generating an update instruction for a configuration table. In some embodiments, an update instruction may include instructions that may update a configuration table associated with one or more computing devices (e.g., user device 106A, node 108A, or the like), which may change the designation of a compliant communication channel. Moreover, the update to the configuration table caused by the update instruction may alter responses by the configuration table to queries relating to the routing of transactions. For example, the update instruction may cause the configuration table to route a high-security transaction to compliant communication channel A as opposed to designating high-security transactions to a former compliant communication channel B.

Further, the update to the configuration table may also change the one or more security actions associated with a particular compliant communication channel. For example, assume the update instruction caused the configuration table to change the designation of a high-security transaction from the former compliant communication channel B to the current compliant communication channel C because former compliant communication channel B has a security concern (e.g., a hardware component in the series of nodes associated with former compliant communication channel B has been recalled). The update instruction may then also describe an instruction to conduct one or more security actions when a transaction is routed to the former (now less secure) communication channel B.

In some embodiments, the update instruction may include a targeted change that alters the designation of transactions that a particular node may receive. For example, if the set of update parameters detail the signal strength of a particular node, the update instruction may be directed at solely marking the particular node as a node with weak signal (e.g., a rogue node), hence limiting the type of transactions (e.g., high-security, low-security, or the like) that the particular node may receive. Alternatively, the update instruction may be directed towards a change that affects (e.g., the designation of transactions, one or more security actions, or the like) a plurality of nodes. For example, the set of update parameters may describe a recent recall of a hardware component present in a plurality of nodes. As a result, the update instruction may be directed towards a plurality of computing devices and instruct computing devices to avoid the plurality of computing devices that include the recalled hardware component.

In some embodiments, security evaluation engine 308 may generate a security profile associated with a node based on the received set of update parameters. In some embodiments, the set of update parameters may describe a set of parameters associated with a particular node (e.g., node 108A, or the like), such as signal strength, noise of the signal, geographic location of the node, hardware components, or the like. The combination of parameters associated with a particular node (e.g., node 108A) may be identified and associated with a security profile for a particular node (e.g., node 108A). The security evaluation engine 308 may use any suitable technique to identify a set of node parameters as components of a security profile associated with a particular node. In some embodiments, the security evaluation engine 308 may use techniques such as optical character recognition (OCR), natural language processing (NLP), searching algorithms, machine learning models, and/or the like to identify components of a security profile. For example, the security evaluation engine 308 may OCR any data in the set of update parameters, if needed, and then search for an indicator of a component a security profile for a node. By means of continuing example, the security evaluation engine 308 may search for the term "decibels", which may act as an indicator of signal strength associated with a particular node.

In some embodiments, security evaluation engine 308 may utilize the security profile associated with one or more computing devices (e.g., node 108A through node 108N, or the like) to generate an update instruction for a configuration table that changes the designation of a compliant communication channel or changes one or more security actions associated with a particular compliant communication channel. Generating the update instruction is described in further detail below in relation to FIG. 7. Turning now to FIG. 7, example operations are shown for generating the update instruction.

As shown by operation 702, the apparatus 300 includes means, such as processing circuitry 302, memory 304, communications hardware 306, security evaluation engine 308, or the like, for identifying a set of configuration update rules. In some embodiments, the set of configuration update rules may describe a data structure that includes conditions that may be required to be met to cause the security evaluation engine 308 to generate an update instruction. For example, the set of configuration update rules may describe thresholds and/or conditions, such as a signal strength threshold associated with a particular node, conditions associated with the security of a compliant communication channel (e.g., MFA requirements, encryptions methods, data masking, etc.), or the like.

In addition, the set of configuration update rules may also include an update instruction associated with a particular threshold or particular condition being met. For example, assume a particular node's signal strength is identified in the security profile associated with the particular node and is below a predetermined signal strength threshold for the particular node, which is included in the set of configuration update rules. As a result, security evaluation engine 308 may query the set of configuration update rules for the suggested update instruction associated with a particular node having a low signal strength. For example, the set of update rules may reference an update instruction to downgrade the security associated with the particular node and/or identify the particular node as a rogue node.

In some embodiments, the set of configuration update rules may be stored in a local storage device, such as memory 304, storage device 110, or the like. Alternatively, the set of configuration update rules may be stored at a third-party storage device. Therefore, security evaluation engine 308 may leverage communications hardware 306 to retrieve the set of configuration update rules. For example, communications hardware 306 may transmit a request via a communications network (e.g., a 6G cellular network or a 5G cellular network, such as communications network 104 shown in FIG. 1) to the external storage device to retrieve the set of configuration update rules, which may be transmitted from the external storage device to the apparatus 300 (e.g., communications hardware 306).

As shown by operation 704, the apparatus 300 includes means, such as processing circuitry 302, memory 304, communications hardware 306, security evaluation engine 308, or the like, for generating an update criticality based on the update parameters and the set of configuration update rules. In some embodiments, an update criticality may be a data construct that if a condition included in the set of configuration update rules has been satisfied. In some embodiments, the update criticality may include one or more identified conditions that are satisfied, which may trigger the generation of an update instruction.

For example, assume the security profile associated with a particular node, which was derived from the set of update parameters, indicates that a particular node has weak signal strength. The update criticality may describe the weak signal strength, the security concerns associated with the nodes weak signal strength, or the like.

In some embodiments, the security evaluation engine 308 may leverage a rules-based model to generate the update criticality. The rules-based model may receive the set of configuration update rules and the set of update parameters and output (e.g., generate) the update criticality. The security evaluation engine 308 may first identify from the set of update parameters, the particular update parameters associated with meeting a threshold in the set of configuration update rules. In some embodiments, the security evaluation engine 308 may use techniques such as optical character recognition (OCR), natural language processing (NLP), searching algorithms, machine learning models, and/or the like for identifying particular update parameters included in the set of update parameters. In some embodiments, security evaluation engine 308 may OCR any data in the set of update parameters, if needed, and then search for an indicator to identify the individual update parameters included in the set of update parameters. For example, the security evaluation engine 308 may search for the term "decibel", which may act as an identifier for signal strength of a particular node. The security evaluation engine 308 may then input the particular update parameters into a rules-based model that reference the set of configuration update rules to identify particular update parameters that may meet predetermined threshold. Security evaluation engine 308 may then generate an update criticality based on the particular update parameter value that met the predetermined threshold.

As shown by operation 706, the apparatus 300 includes means, such as processing circuitry 302, memory 304, communications hardware 306, security evaluation engine 308, or the like, for generating the update instruction. The update instruction may be a data packet that comprises instructions to update a configuration table. In some embodiments, the update to the configuration table may be based on the update criticality satisfying a predefined update threshold. In some embodiments, the update criticality may describe an identified defect in the performance of a node (e.g., in a security profile of a node, or the like), however, the defect may not trigger the generation of an update instruction. For example, a lower overall performance of a particular node (e.g., node 108A) may be compounded by many particular update parameters included in the set of update parameters compounding to lower the overall performance of a particular node. Therefore, the individual particular update parameters may not constitute generating an update instruction as the individual small update parameters may not satisfy a predefined update threshold. However, the update instruction may instruct the configuration table to downgrade the security attached to the particular node, which may cause additional one or more security actions, such as the requirement of performing one or more security actions prior to using the particular node to transmit high-security transaction data.

In some embodiments, the security evaluation engine 308 may identify the particular update instruction by searching the set of configuration update rules, which may be formatted as key-value pairs where the key is a particular threshold or particular condition (e.g., a decibel range of acceptable signal strength, or the like), and the value is an update instruction associated with a particular update parameter meeting a particular threshold. As a result, security evaluation engine 308 may query the set of configuration update rules for a particular key and retrieve the value associated with the key from the set of configuration update rules to identify an update instruction associated with the update criticality.

In some embodiments, security evaluation engine 308 may leverage a rules-based model to generate an update instruction. For example, the rules-based model may be input a particular update criticality and the set of configuration update rules and output the update instruction. In some embodiments, the update criticality may include a singular identified criticality (e.g., a particular node with low signal strength), which may be associated with a single update instruction associated with a particular configuration table (e.g., a copy of a configuration table hosted locally on a particular computing device, such as user device 106A). Alternatively, the update criticality may include a plurality of identified criticalities, which may result in generating multiple update instructions associated with many configuration tables.

Returning to FIG. 6, as shown by operation 606, the apparatus 300 includes means, such as processing circuitry 302, memory 304, communications hardware 306, or the like, for distributing the update instruction to one or more computing devices (e.g., user device 106A, node 108A, or the like) respectively hosting copies of the configuration table. In some embodiments, communications hardware 306 may retrieve the generated update instructions from a local storage device (e.g., memory 204, storage device 110, or the like) and distribute (e.g., simultaneously transmitting) the update instruction to a plurality of computing devices via a cellular network (e.g., a 5G cellular network or a 6G cellular network such as communications network 104, shown in FIG. 1). For example, communications hardware 306 may distribute the update instruction to the series of nodes included in channel A, channel B, and channel C simultaneously.

In addition, the update instructions may be distributed amongst a plurality of compliant communication channels. For example, if the update instructions are associated with the configuration of a singular configuration table, a compliant communication channel may be selected that aligns with the urgency (e.g., level of security) of the data included in the update instruction. For example, an update instruction may include urgent information that must be distributed immediately, which may result in a compliant communication channel being selected based on the compliant communication channel that is projected to deliver the update instruction to a computing device (e.g., user device 106A) via a cellular network (e.g., a 6G cellular network, such as communications network 104 shown in FIG. 1) in the shortest amount of time.

Further, if the update instructions are associated with a plurality of nodes (e.g., node 108A through node 108N), such as an update instruction to avoid nodes with a particular hardware component, the update instructions may be transmitted simultaneously to all known computing devices (e.g., user device 106A, node 108A, or the like) that have configuration tables that reference routing transaction data to a computing devices with the particular hardware component via a plurality of compliant communication channels each of which may deliver the update instruction to a particular computing device in the shortest amount of time.

FIGS. 4, 5, 6, and 7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Interaction

Figure 8:
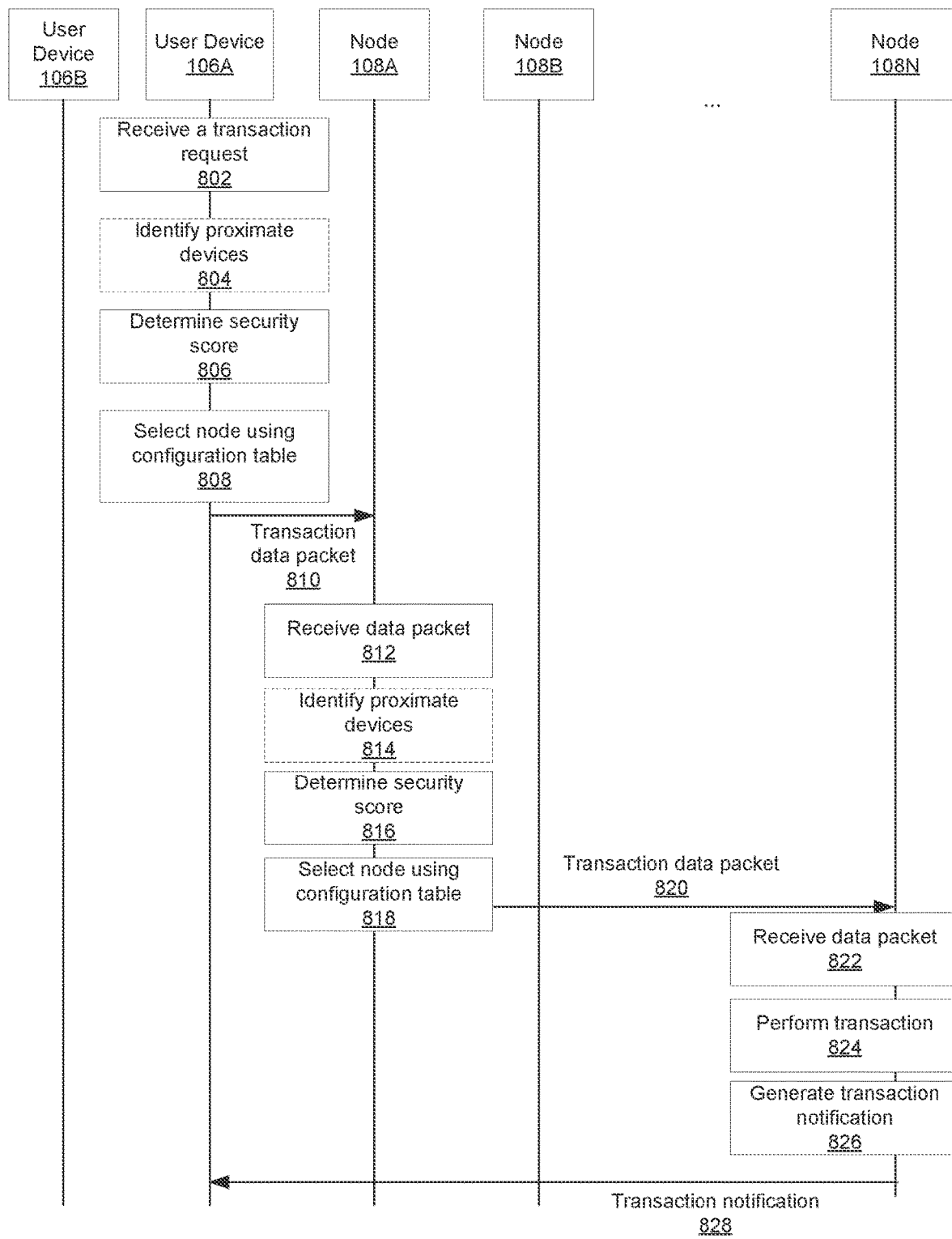
FIG. 8 illustrates a swim lane diagram with example operations that may be performed by components of the environment depicted in FIG. 1 in order to regulate data communication, in accordance with some example embodiments described herein.

FIG. 8 shows a swim lane diagram illustrating example operations (e.g., as described above in connection with FIGS. 4-5) performed by components of the environment depicted in FIG. 1 to produce various benefits of the implementations described herein. The operations shown in the swim lane diagram performed by user device 106A are shown along the line extending from the box labeled "user device 106A" operations performed by a node 108A are shown along the line extending from the box labeled "node 108A", and operations performed by node 108N are shown along the line extending from the box labeled "node 108N". Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 8.

At operation 802, user device 106A may receive a transaction request. At operation 804, user device 106A may identify a proximate device, such as user device 106B. At operation 806, user device 106A may determine a security score associated with the transaction request. At operation 808, user device 106A may select a node (e.g., node 108A) to transmit a data packet associated with the received transaction request by using a configuration table. At operation 810, user device 106A may provide a transaction data packet associated with the transaction request to node 108A. At operation 812, node 108A may receive the transaction data packet from user device 106A. At operation 814, if possible, node 108A may identify proximate devices. At operation 816, node 108A may determine a security score based on the received transaction data packet. At operation 818, Node 108A may select a node to transmit a transaction data packet to. In some embodiments, node 108A may identify node 108B as a rogue node and thus select node 108N. At operation 820, node 108A may provide the transaction data packet to node 108N. At operation 822, node 108N may receive the transaction data packet from node 108A. At operation 824, node 108N may perform the transaction. At operation 826, node 108N may generate a transaction notification that indicates the performance of the transaction. At operation 828, node 108N may provide the transaction notification to user device 106A.

Figure 9:
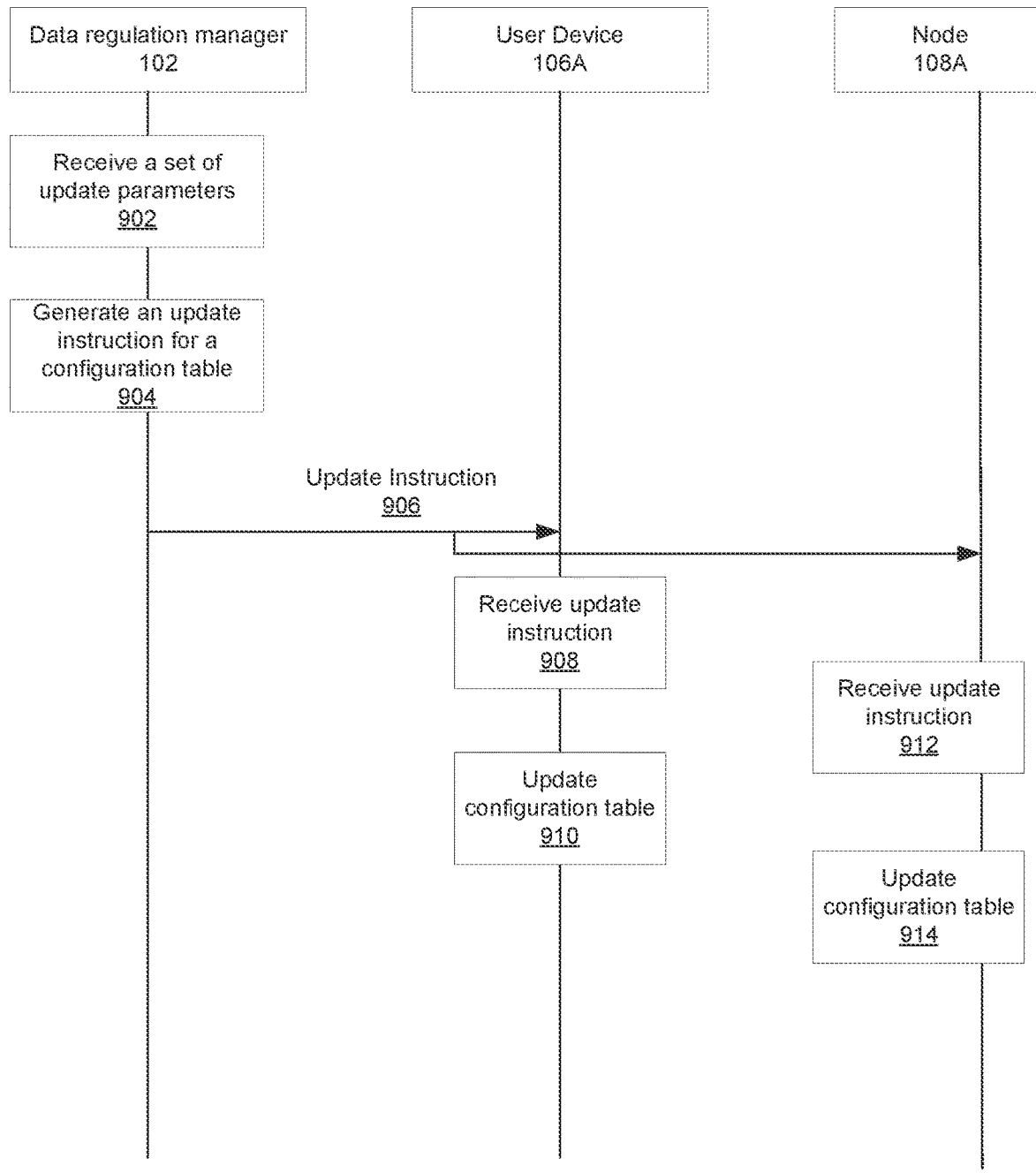
FIG. 9 illustrates a swim lane diagram with example operations that may be performed by components of the environment depicted in FIG. 1 in order to update a configuration of computing devices, in accordance with some example embodiments described herein.

FIG. 9 shows a swim lane diagram illustrating example operations (e.g., as described above in connection with FIGS. 5-7) performed by components of the environment depicted in FIG. 1 to produce various benefits of the implementations described herein. The operations shown in the swim lane diagram performed by data regulation manager 102 are shown along the line extending from the box labeled "data regulation manager 102" operations performed by user device 106A are shown along the line extending from the box labeled "user device 106A" and operations performed by node 108A are shown along the line extending from the box labeled "node 108A". Operations impacting multiple devices, such as data transmissions between the devices, are shown using arrows extending between these lines. Generally, these operations are ordered temporally with respect to one another. However, it will be appreciated that the operations may be performed in other orders from those illustrated in FIG. 9.

At operation 902, data regulation manager 102 may receive a set of update parameters. At operation 904, the data regulation manager 102 may generate an update instruction for a configuration table based on the received set of update parameters. At operation 906, the data regulation manager 102 may distribute the update instruction to one or more computing devices (e.g., user device 106A and/or node 108A) that are storing a local copy of the configuration table. At operation 908, user device 106A may receive the update instruction from data regulation manager 102. At operation, 910, user device 106A may update its local configuration table based on the received update instruction. At operation 912, node 108A may receive an update instruction from data regulation manager 102. At operation 914, node 108A may update its local configuration table based on the received update instruction.

In some embodiments, some of the operations described above in connection with FIGS. 4-9 may be modified or further amplified. Furthermore, in some embodiments, additional optional operations may be included. Modifications, amplifications, or additions to the operations above may be performed in any order and in any combination.

Figure 10:
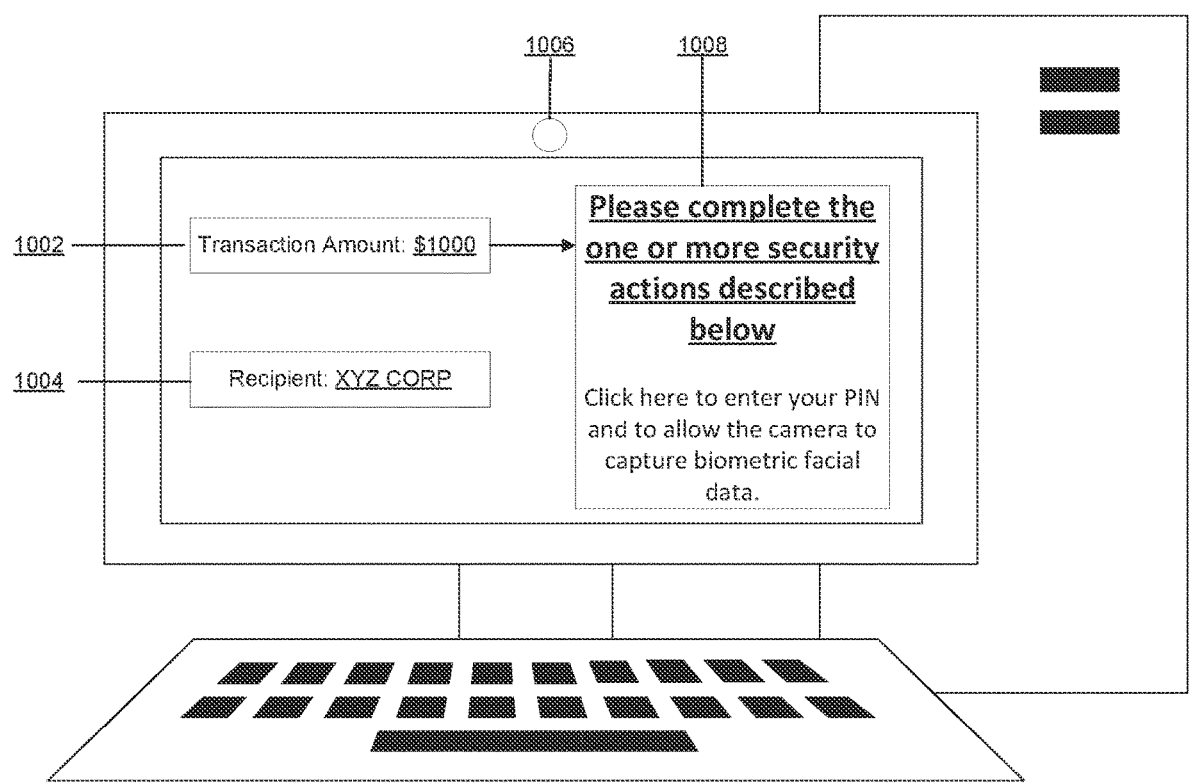
FIG. 10 illustrates an example user interface used in some example embodiments described herein.

Turning to FIG. 10, a graphical user interface (GUI) is provided that illustrates an example user interface. As noted previously, a user may receive a transaction request on a computing device associated with the user (e.g., user device 106A). In such an embodiment, the GUI shown in FIG. 10 may be displayed to a user by the apparatus 200.

The transaction amount 1002 may be automatically displayed. Alternatively, a visual indicator, such as the transaction amount 1002 blinking, may prompt a user to input a transaction amount value. The recipient 1004 (e.g., the counterparty) may be automatically input in the transaction request. Alternatively, a visual indicator, such as the recipient 1004 blinking, may prompt a user to input a recipient in the transaction request. In addition, if the transaction amount exceeds particular value, camera 1006 may be triggered causing camera 1006 to capture biometric data about the user. A required one or more security actions graphic 1008 may also be displayed in the transaction request. By means of continuing example where the transaction amount exceeds a particular value and triggers camera 1006 to capture biometric data, the user may manually input authentication factors, such as a PIN, initiate biometric facial scan, and/or the like.

Conclusion

As described above, example embodiments provide methods and apparatuses that enable improved ability to regulate data by leveraging a 5G cellular network or a 6G cellular network to route communication of data with varying levels of security that are contextually appropriate. Example embodiments thus provide tools that overcome the problems faced by individuals and entities for leveraging a central server to determine a particular communication channel for transmitting data of varying security (e.g., high-security, low-security, or the like). By avoiding the need for a hub-and-spoke central server to perform evaluations of transactions to determine the level of security associated with the transactions, example embodiments thus save network time and resources, while also limiting the surface area by which bad actors might commit fraud. Moreover, embodiments described herein avoid fraud by automatically detecting if a transaction is considered high security and enacting corresponding authentication methods, such as passive multifactor authentication prior to transmitting the high security information. Finally, by automating the detection of a security level associated with transactions at the user device level (a departure from legacy systems that have historically required a central server), the speed and consistency of the evaluations performed by example embodiments unlocks many potential new functions that have not previously been available, such as the ability to conduct near-real-time evaluations of the security level of data and, based on the security level, causing engagement of additional authentication methods to further protect high security level transactions. Example embodiments contemplated herein thus provide technical solutions that solve real-world problems faced during data communication. And while data security has been an issue for decades, the recently exploding amount of high security data transmitted via cellular networks made available by recently emerging technology today has made this problem significantly more acute even while the complexity of transmitted data has itself increased. Example embodiments described herein thus represent a technical solution to increasingly important real-world data security concerns.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for regulating data communication, the method comprising:
    receiving, by transaction circuitry, a communication request;
    identifying, by a data collection engine and based on the communication request, a set of security parameters;
    determining, by a security analysis engine and based on the set of security parameters, a security score associated with the communication request;
    in an instance in which the security score fails to satisfy a security score requirement:
        determining, by the security analysis engine, one or more security actions based on the security score, and
        performing, by the transaction circuitry, the one or more security actions; and
    routing, by a data regulation engine and based on a configuration table, a transaction associated with the communication request to a compliant communication channel, wherein the compliant communication channel comprises a series of nodes.

2. The method of claim 1, wherein the set of security parameters includes a nearby device proximity parameter, and wherein the method further comprises:
    identifying, by the data collection engine, one or more computing devices within a predefined proximity, wherein the predefined proximity is defined by the nearby device proximity parameter; and
    evaluating, by the data collection engine, whether the one or more computing devices satisfy the nearby device proximity parameter, wherein determining the security score is based on the evaluation.

3. The method of claim 1, wherein the configuration table is stored locally.

4. The method of claim 1, wherein routing the transaction further comprises:
    selecting, by the security analysis engine and based on the configuration table, an initial node of the compliant communication channel; and
    transmitting, by communications hardware to the initial node: (i) a transaction data packet corresponding to the transaction and (ii) an instruction to select a next node of the compliant communication channel, wherein the initial node included in the series of nodes evaluates the compliant communication channel associated with the transaction.

5. The method of claim 4, wherein selecting the initial node based on the configuration table further comprises:
    querying, by the security analysis engine, the configuration table for the initial node of the compliant communication channel.

6. The method of claim 4, wherein the transaction data packet comprises an indication of the set of security parameters and the one or more security actions.

7. The method of claim 4, further comprising:
    identifying, by the data collection engine, a set of candidate nodes; and
    selecting, by the data regulation engine, a particular node from the set of candidate nodes for the transaction.

8. The method of claim 7, further comprising:
    identifying, by the data collection engine, a rogue node; and
    prior to selecting the particular node, removing, by the data regulation engine, the rogue node from the set of candidate nodes for the transaction.

9. The method of claim 8, wherein identifying the rogue node further comprises:
    identifying, by the data collection engine, a set of node parameters, wherein the set of node parameters is associated with a candidate node in the set of candidate nodes; and
    identifying, by the data regulation engine and based on the set of node parameters, the candidate node as the rogue node.

10. The method of claim 1, further comprising:
    identifying, by the data collection engine at a first time, a primary instance associated with an individual, wherein the primary instance comprises data about the individual; and
    storing, by the data collection engine, the primary instance associated with the individual.

11. The method of claim 10, further comprising:
    comparing, by the security analysis engine, the primary instance to the set of security parameters to produce a similarity score,
    wherein determining the security score is based on the similarity score.

12. The method of claim 1, wherein routing the transaction further comprises:
    identifying, by the data regulation engine, a compliant channel; and transmitting, by communications hardware, the transaction through the compliant channel.

13. The method of claim 1, wherein the compliant communication channel is a channel of a 5G cellular network or a 6G cellular network.

14. An apparatus for regulating data communication, the apparatus comprising:
- transaction circuitry configured to receive a communication request;
- a data collection engine configured to identify, based on the communication request, a set of security parameters; and
- a security analysis engine configured to determine, based on the set of security parameters, a security score associated with the communication request,
- wherein the transaction circuitry is further configured to, in an instance in which the security score fails to satisfy a security requirement:
  - determine one or more security actions based on the security score; and
  - perform the one or more security actions,
- wherein the apparatus further comprises a data regulation engine configured to route, based on a configuration table, a transaction associated with the communication request to a compliant communication channel, wherein the compliant communication channel comprises a series of nodes.

15. The apparatus of claim 14, wherein the security analysis engine is further configured to select, based on the configuration table, an initial node of the compliant communication channel; and
- wherein the apparatus further comprises communication hardware configured to transmit to the initial node: (i) a transaction data packet corresponding to the transaction and (ii) an instruction to select a next node of the compliant communication channel, wherein the initial node included in the series of nodes evaluates the compliant communication channel associated with the transaction.

16. The apparatus of claim 15, wherein the security analysis engine is further configured to:
query the configuration table for the initial node of the compliant communication channel.

17. The apparatus of claim 15, wherein the transaction data packet comprises an indication of the set of security parameters and the one or more security actions.

18. A non-transitory computer-readable storage medium storing instructions that, when executed by an apparatus, cause the apparatus to:
- receive a communication request;
- identify, based on the communication request, a set of security parameters;
- determine, based on the set of security parameters, a security score associated with the communication request;
- in an instance in which the security score fails to satisfy a security requirement:
  - determine one or more security actions based on the security score, and
  - performing the one or more security actions; and
- route, based on a configuration table, a transaction associated with the communication request to a compliant communication channel, wherein the compliant communication channel comprises a series of nodes.

19. The non-transitory computer-readable storage medium of claim 18, wherein the instructions, when executed by the apparatus, further cause the apparatus to:
- select, based on the configuration table, an initial node of the compliant communication channel; and
- transmit to the initial node: (i) a transaction data packet corresponding to the transaction and (ii) an instruction to select a next node of the compliant communication channel, wherein the initial node included in the series of nodes evaluates the compliant communication channel associated with the transaction.

20. The non-transitory computer-readable storage medium of claim 19, wherein the instructions, when executed by the apparatus, further cause the apparatus to:
query the configuration table for the initial node of the compliant communication channel.

* * * * *